(12) United States Patent
Matsunaga et al.

(10) Patent No.: US 6,258,519 B1
(45) Date of Patent: Jul. 10, 2001

(54) TRANSPARENT MAGNETIC RECORDING MEDIUM

(75) Inventors: Naohiro Matsunaga; Tsutomu Arai, both of Minami-ashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/391,627

(22) Filed: Sep. 7, 1999

(51) Int. Cl.$^7$ .................................................. G03C 1/85
(52) U.S. Cl. ..................... 430/523; 430/527; 430/531; 430/533
(58) Field of Search .................... 430/523, 527, 430/531, 533

(56) References Cited

U.S. PATENT DOCUMENTS

| | | | |
|---|---|---|---|
| 5,288,598 | * 2/1994 | Sterman et al. | 430/496 |
| 5,344,751 | * 9/1994 | Carlson | 430/527 |
| 5,395,743 | * 3/1995 | Brick et al. | 430/496 |
| 5,432,050 | 7/1995 | James et al. . | |
| 5,434,037 | 7/1995 | Wexler et al. . | |
| 5,776,668 | * 7/1998 | Oltean et al. | 430/523 |
| 5,965,339 | * 10/1999 | Smith et al. | 430/512 |
| 6,048,677 | * 4/2000 | Chen et al. | 430/527 |
| 6,060,229 | * 5/2000 | Eichorst et al. | 430/529 |
| 6,087,081 | * 7/2000 | Yamamouchi et al. | 430/531 |

FOREIGN PATENT DOCUMENTS 7219091   8/1995   (JP) .

OTHER PUBLICATIONS

Ludox ®—What Is?. www.dupont.com/silica/ludox–wi, 1999.*

* cited by examiner

Primary Examiner—Janet Baxter
Assistant Examiner—Amanda C. Walke
(74) Attorney, Agent, or Firm—Birch, Stewart, Kolasch & Birch, LLP

(57) ABSTRACT

There is disclosed a transparent magnetic recording medium comprising a support and at least one magnetic recording layer containing magnetic particles provided thereon, which comprises, as an upper layer coated on the magnetic recording layer, a layer that contains at least one sort of spherical inorganic particles having a Mohs' hardness of 6 to 8, the surface of the particles being treated with at least one of primary, secondary, or tertiary amine-series silane coupling agents, and that contains a higher fatty acid ester sliding agent. The transparent magnetic recording medium causes no error in magnetic input/output and also excels in transparency.

20 Claims, No Drawings

TRANSPARENT MAGNETIC RECORDING MEDIUM

FIELD OF THE INVENTION

The present invention relates to a transparent magnetic recording medium, a surface of which contains spherical inorganic particles having a Mohs' hardness of from 6 to 8, that provides no error of magnetic input/output and also excels in transparency.

BACKGROUND OF THE INVENTION

A magnetic recording layer of a magnetic recording medium, such as an audiotape, a videotape, and a floppy disc, contains a high content (coating amount).of magnetic substance, which results in lack of light-permeability, even though high magnetic output (reading) capability can be attained. Consequently, the above-described magnetic recording layer cannot be applied onto the printing surface of a magnetic card or onto a photographic film. U.S. Pat. No. 5,491,051 describes photographic elements that exhibit excellent magnetic and photographic characteristics, and that are capable of repeated use. A difficulty, however, arises for these photographic elements in that recording and reading of magnetic recording information, such as conditions at the time of development and printing, are not assured, as well as at the time of a repeat usage, incorporated with various information, such as the date of photographing, weather, conditions for illumination, conditions at the time of photographing (e.g. the ratio of reduction to enlargement), the number of leaves for reprinting, an area to be zoomed, and some messages. Further, transparent magnetic layer-related techniques are described in JP-A-4-214217 ("JP-A" means unexamined published Japanese patent application), JP-A-6-161033, U.S. Pat. No. 5,496,687, U.S. Pat. No. 5,432,050, U.S. Pat. No. 5,436,120, and U.S. Pat. No. 5,434,037.

SUMMARY OF THE INVENTION

Practically, when a transparent magnetic recording medium is used as, for example, a photographic element (photographic light-sensitive material), a stain (staining materials) of the magnetic head is mainly composed of a dried solid of the developing solution, and it is a very adhesive stain. The above-described adhesive stain, which does not exist when an ordinary magnetic recording medium is used, becomes adhered to and deposited on a magnetic head, so that the contact of a magnetic layer with the head is considerably deteriorated. Further, so-called spacing loss occurs, which results in an error in reading of the magnetic recording. Even if alumina abrasives, which are used for an ordinary magnetic recording medium, are used to clean the stained head, adhesion of a dried solid of the developing solution onto the magnetic head cannot be sufficiently prevented by a previously known method. Further, when the amount of the alumina abrasives to be used is increased, or the grain size of a alumina abrasives is increased, a new problem arises that, nevertheless, the stain-removing efficiency is not so improved, and undesirably the transparency of the medium is extremely decreased, which is disadvantageous to photographic use, and the life (duration) of the magnetic head is drastically shortened.

As a result of their investigation, the present inventors has made clear that it is very effective to locate, at the surface of the medium, spherical inorganic particles having a Mohs' hardness of 6 to 8, preferably monodispersed amorphous (noncrystalline) silica particles, to remove the stain that occurs when a transparent magnetic recording medium is used as a photographic element, i.e., a stain due to a dried solid of the developing solution. Further, according to the above-mentioned method, not only can the contact of a stain originating from a developing solution to a magnetic head be prevented, but also a highly adhesive stain can be removed (cleaned). Further, as a result of investigation, it has been found that these spherical inorganic particles can be extremely uniformly distributed in the surface by a method wherein the spherical inorganic particles are added to a coating solution containing a higher fatty acid ester sliding agent for an upper layer than the magnetic recording layer, and at the time of coating, a part of the magnetic recording layer that is an under layer is dissolved with a solvent of the said coating solution, to thereby incorporate the spherical inorganic particles therein, rather than by incorporating the spherical inorganic particles into the magnetic recording layer that is an under layer. However, the dispersion stability of inorganic particles with the lapse of time is not so good that the thus-prepared inorganic particles in a medium are apt to exist as an aggregate. Consequently, there is the possibility that such problems as reduction in transparency, falling off of the inorganic particles, and increase in a load at the production, will arise. Accordingly, the present invention aims to solve such problems, and to thereby provide an excellent magnetic recording medium.

That is, an object of the present invention is to provide a transparent magnetic recording medium that causes no error in magnetic input/output and also excels in transparency.

Other and further objects, features, and advantages of the invention will appear more fully from the following description.

DETAILED DESCRIPTION OF THE INVENTION

The above-described object of the present invention has been attained by (1) a transparent magnetic recording medium comprising a support and at least one magnetic recording layer containing magnetic particles provided thereon, which comprises, as an upper layer coated on the magnetic recording layer, a layer that contains at least one sort of spherical inorganic particles having a Mohs' hardness of 6 to 8, the surface of the particles being treated with at least one of primary, secondary, or tertiary amine-series silane coupling agents, and that contains a higher fatty acid ester sliding agent; and by (2) a silver halide photographic light-sensitive material which has the above-described transparent magnetic recording medium.

As preferable embodiments of the present invention, the following magnetic recording mediums and light-sensitive material can be mentioned.

(3) The transparent magnetic recording medium as stated in the above (1), wherein the surface of the spherical inorganic particles is treated with at least one of anionic surface active agents in combination with at least one of the primary, secondary, or tertiary amine-series silane coupling agents.

(4) The transparent magnetic recording medium as stated in the above (1), wherein the spherical inorganic particles are noncrystalline silica particles.

(5) The transparent magnetic recording medium as stated in the above (1), wherein said higher fatty acid ester sliding agent is previously dispersed with a solvent containing cyclohexanone, to form a dispersion thereof, and said upper layer contains the above-said dispersion of the higher fatty acid ester sliding agent, and at least one of coating solvents selected from a group consisting of diacetone alcohol, 1-acetoxy-2-methoxyethane, ethylene glycoldiacetate, methyl acetoacetate, and ethyl acetoacetate.

(6) The transparent magnetic recording medium as stated in the above (1), wherein said transparent magnetic recording layer contains inorganic particles having a primary particle size of from 1 nm to 50 nm in an amount of from 10 mg/m$^2$ to 200 mg/m$^2$.

(7) The transparent magnetic recording medium as stated in the above (6), wherein the inorganic particles are colloidal silica.

(8) The transparent magnetic recording medium as stated in the above (1), which further comprises spherical organic high molecular particles.

(9) The transparent magnetic recording medium as stated in the above (8), wherein an average primary particle size of the spherical organic high molecular particles is larger than an average primary particle size of the spherical inorganic particles.

(10) The transparent magnetic recording medium as stated in the above (8), wherein said transparent magnetic recording layer further contains alumina abrasives having substantially higher particle size than the any average height of the surface protrusion of said spherical inorganic particles and said spherical organic high molecular particles.

(11) A silver halide photographic light-sensitive material comprising the transparent magnetic recording layer as stated in any one of the above (3) to (10), which comprises at least one light-sensitive silver halide emulsion layer provided on one side of a support opposite to the transparent magnetic recording layer.

For the coating solution containing a higher fatty acid ester sliding agent that is coated on the magnetic recording layer of a magnetic recording medium of the present invention, an organic solvent, which does not deteriorate the dispersion stability of the higher fatty acid ester sliding agent, is used. In order to insure the dispersion stability of hydrophilic inorganic particles even in an organic solvent in which such a higher fatty acid ester sliding agent exists, it is effective that the surface of the inorganic particles is previously treated with a primary to tertiary amine-series silane coupling agent. As the silane coupling agent, essentially one or more primary to tertiary amine-series silane coupling agents, preferably one or more primary to secondary amine-series silane coupling agents, and more preferably one or more primary amine-series silane coupling agents, are used.

The amount of an amine-series silane coupling agent to be used is determined in accordance with a specific surface area of the inorganic particles to be used. A standard amount is 0.1 to 20 wt. %, preferably 0.5 to 15 wt. %, and more preferably 2 to 10 wt. %, based on the weight of the inorganic particles.

The above-described silane coupling agents are treated according to a direct treatment method or an integral blend method to inorganic particles. Examples of the direct treatment method include a dry process, a slurry process, and a spray process. For the dry process, it is preferred from the view point of a sure surface treatment to practice the steps of: mixing, for example, inorganic particles, a small amount of water, or an organic solvent, or an organic solvent containing water, and a coupling agent, to make a dispersion; thereafter removing water and/or the organic solvent from the dispersion; and then dispersing again the residue. However, in view of reduction in an industrial load, it is most effective to add a silane coupling agent to a dispersion solution when the dispersion solution of inorganic particles is prepared, and to thereby adsorb the silane coupling agent on the inorganic particles and react with each other in the dispersion solution.

Specific examples of the silane coupling agents used for the present invention are illustrated below.

"Primary"

(1-1)

(1-2)

(1-3)

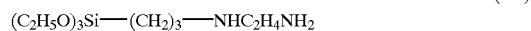

(1-4)

(1-5)

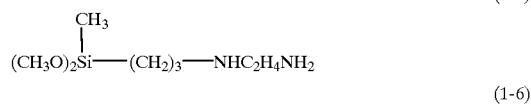

(1-6)

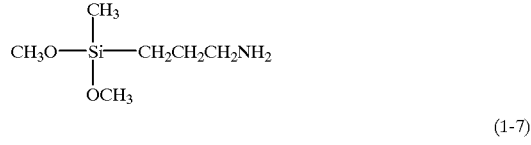

(1-7)

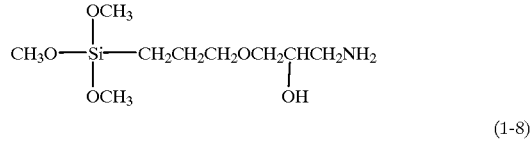

(1-8)

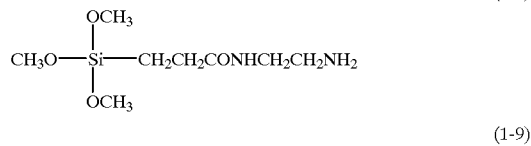

(1-9)

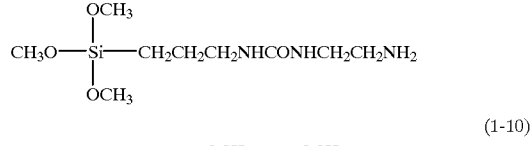

(1-10)

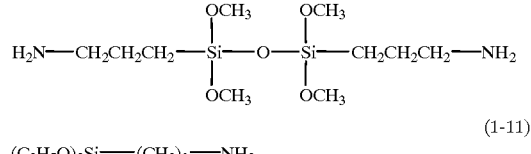

(1-11)

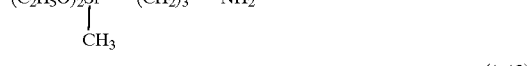

(1-12)

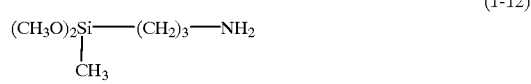

"Secondary"

(1-13)

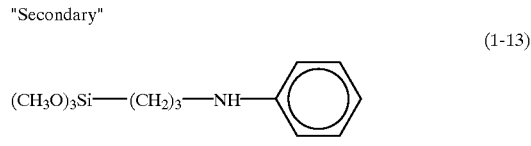

(1-14)

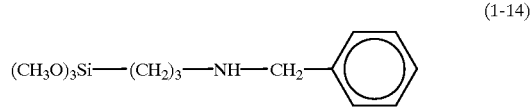

-continued

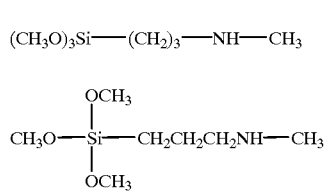 (1-15)

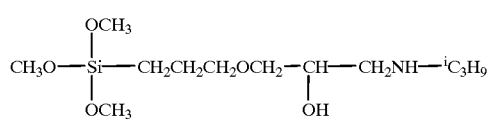 (1-16)

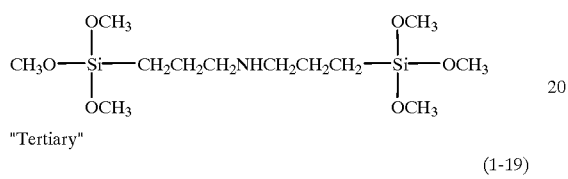 (1-17)

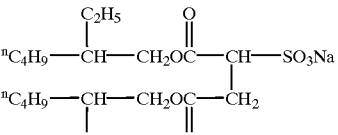
"Tertiary" (1-18)

(1-19)

(1-20)

(1-21)

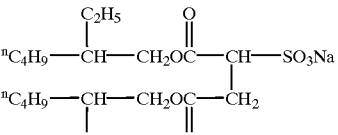 (2-1)

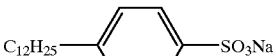 (2-2)

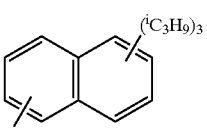 (2-3)

$^nC_{12}H_{25}OSO_3Na$ (2-4)

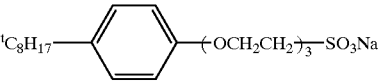 (2-5)

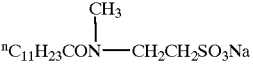 (2-6)

$C_{11}H_{23}CH(OH)-CH_2CH_2SO_3Na$   $C_{11}H_{23}CH=CH-CH_2SO_3Na$ (2-7)

A mixture in 40/60 wt %

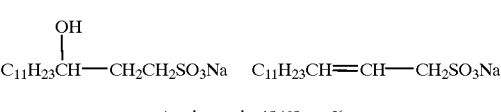 (2-8)

$C_{12}H_{25}O-(CH_2CH_2O)_{10}-(CH_2)_4-SO_3Na$ (2-9)

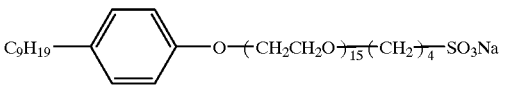 (2-10)

Further, for the improvement in the dispersion stability of inorganic particles, it is very effective to treat the surface of the inorganic particles with at least one anionic surface active agent and the above-mentioned amine-series silane coupling agent in combination.

A standard amount of the anionic surface active agent to be used is almost the same as that of the amine-series silane coupling agent used together. Specifically, the amount of an anionic surface active agent is generally from 0.1 to 20 wt. %, preferably from 0.5 to 15 wt. %, and more preferably from 2 to 10 wt. %, based on the weight of the inorganic particles. Likewise the amine-series silane coupling agent, when the amount of the anionic surface active agent to be used is over the range, a lowering of a lubricating effect, provided by a higher fatty acid ester sliding agent, is caused, and therefore such an excess amount is not preferable.

Specific examples of the anionic surface active agent for use in the present invention are illustrated below.

Next, a higher fatty acid ester sliding agent for use in the present invention is described in detail.

Examples of known esters include higher fatty acid esters (esters obtained from fatty acids having 10 to 24 carbon atoms and alcohols having 10 to 24 carbon atoms) as disclosed in JP-B-58-33541, British patent 927,446, JP-A-55-126238, and JP-A-58-90633; esters obtained from straight-chain higher fatty acids and straight-chain higher alcohols as disclosed in JP-A-58-50534, and esters obtained from higher fatty acids containing a branched alkyl group and higher alcohols.

Long chain alkyl compounds, as represented by formulae (1) and (2), are preferred as a higher fatty acid ester sliding agent, on account that sufficient sliding property and scratch-resisting property are obtained both before and after the development.

$R^1X^1R^2$   Formula (1)

$R^3X^2R^4X^3R^5$   Formula (2)

In formula (1), $R^1$ and $R^2$ each represent an aliphatic hydrocarbon group. It is necessary that the total carbon atoms of these compounds are from 25 to 120. The total carbon atoms 25 or more are necessary to obtain sufficient sliding property. Further, when the total carbon atoms are over 120, a solubility to an organic solvent becomes poor, so that application by a dispersion and/or a coating becomes difficult. The total carbon atoms are more preferably from 30 to 100, and further more preferably from 40 to 80. Further $R^1$ and $R^2$ each are preferably an aliphatic hydrocarbon group having 10 to 70 carbon atoms, which is able to provide sufficient scratch-resisting property and to control a deterioration of the sliding property under various conditions in the practical use. On the other hand, when the number of carbon atoms is 10 or less, the scratch-resisting property becomes worse, and a deterioration of the sliding property occurs due to transfer of a sliding agent under various conditions in the particle use. Further, an aliphatic compound having 70 or more carbon atoms with one terminal modified by a functional group, generally has not been known, except for especially synthesized materials. Such an aliphatic hydrocarbon group may be a straight-chain structure, may have an unsaturated bond, may have a substituent, or may have a branched-chain structure. Of these hydrocarbon groups, those having a straight-chain structure are especially preferred from a view point of the scratch-resisting property. Each of $R^1$ and $R^2$ more preferably has 15 to 50 carbon atoms.

In formula (2), $R^3$, $R^4$ and $R^5$ each represent an aliphatic hydrocarbon group. It is necessary that the total carbon atoms of the compound are from 30 to 150. The total carbon atoms of 30 or more are necessary to obtain a sufficient sliding property. Further, when the total carbon atoms are over 150, a solubility to an organic solvent becomes poor, so that application by a dispersion and/or a coating becomes difficult. The total carbon atoms are more preferably from 40 to 130, and further more preferably from 50 to 120. Further, $R^3$ and $R^5$ each are preferably an aliphatic hydrocarbon atom having 10 to 70 carbon atoms, and $R^4$ is preferably an aliphatic hydrocarbon group having 10 to 50 carbon atoms, because these groups are able to provide a sufficient scratch-resisting property and to control a deterioration of the sliding property under various conditions in the practical use. When the number of carbon atoms of $R^3$ and $R^5$ is 10 or less, the scratch-resisting property becomes worse, and a deterioration of the sliding property occurs due to transfer of a sliding agent under various conditions in the practical use. Further, an aliphatic compound having 70 or more carbon atoms with one terminal modified by a functional group, generally has not been known. Such an aliphatic hydrocarbon group may be a straight-chain structure, may have an unsaturated bond, may have a substituent, or may have a branched-chain structure. Of these hydrocarbon groups, those having a straight-chain structure are especially preferred from a view point of the scratch-resisting property. The number of carbon atoms of $R^3$ and $R^5$ is especially preferably from 15 to 50. Further, when the number of carbon atoms of $R^4$ is 10 or less, the scratch-resisting property becomes worse, and a deterioration of the sliding property occurs due to transfer of a sliding agent under various conditions in the practical use. Further, an aliphatic compound having 50 or more carbon atoms with both terminals modified by functional groups, generally has not been known, except for especially synthesized compounds. These aliphatic hydrocarbon groups also may be a straight-chain structure, may have an unsaturated bond, may have a substitute, or may have a branched-chain structure. Of these hydrocarbon groups, those having a straight-chain structure are especially preferred from the view point of the scratch-resisting property. The number of carbon atoms of $R^4$ is preferably from 10 to 30, and especially preferably from 12 to 25.

Further, in formulae (1) and (2), $X^1$, $X^2$ and $X^3$ each represent a divalent linking group. Specific examples of the divalent linking group include —C(O)O—, —C(O)NR—, —SO$_3$—, —OSO$_3$—, —SO$_2$NR—, —O—, and —OC(O)NR—, wherein R represents H, or an alkyl group having 8 or less carbon atoms.

Specific examples of the compounds represented by the above-mentioned formulae (1) and (2) are illustrated below.

(3-1) n-$C_{15}H_{31}COOC_{30}H_{61}$-n
(3-2) n-$C_{17}H_{35}COOC_{40}H_{81}$-n
(3-3) n-$C_{15}H_{31}COOC_{50}H_{101}$-n
(3-4) n-$C_{27}H_{43}COOC_{28}H_{57}$-n
(3-5) n-$C_{21}H_{43}COOCH_2CH(CH_3)$—$C_9H_{19}$
(3-6) n-$C_{21}H_{43}COOC_{24}H_{49}$-iso
(4-1) n-$C_{29}H_{49}OCO(CH_2)_2COOC_{24}H_{49}$-n
(4-2) n-$C_{18}H_{37}OCO(CH_2)_4COOC_{40}H_{81}$-n
(4-3) n-$C_{18}H_{37}OCO(CH_2)_{18}COOC_{18}H_{37}$-n
(4-4) iso-$C_{24}H_{49}OCO(CH_2)_4COOC_{24}H_{49}$-n
(4-5) n-$C_{40}H_{81}OCO(CH_2)_2COOC_{50}H_{101}$-n
(4-6) n-$C_{17}H_{35}COO(CH_2)_6OCOC_{17}H_{35}$-n
(4-7) n-$C_{21}H_{43}COO(CH_2)_{18}OCOC_{21}H_{43}$-n
(4-8) iso-$C_{23}H_{47}COO(CH_2)_2OCOC_{23}H_{47}$-n
(4-9) iso-$C_{15}H_{31}COO(CH_2)_6OCOC_{21}H_{43}$-n The amount of the sliding agents represented by formulae (1) and (2) for use in the present invention is not limited in particular, but in the case where spherical inorganic particles exist together with the sliding agent, the amount of the sliding agent necessary to reveal a sufficient sliding property and a scratch-resisting property, is preferably from 0.01 to 0.1 g/m$^2$, more preferably from 0.02 to 0.07 g/m$^2$, and more preferably from 0.03 to 0.05 g/m$^2$.

More preferred sliding agents are compounds represented by the above-mentioned formulae (1) and (2) wherein at least one of $R^1$ and $R^2$, or at least one of $R^3$, $R^4$, and $R^5$ has a polar substituent. The term "a polar substituent" herein referred to means a hydrogen bond-forming group, or an ionic dissociative group. The polar substituting for use in the present invention is not limited in particular, but preferable examples thereof include —OH, —COOH, —COOM, —NH$_2$, —NR$^3$ $^+A^-$, and —CONH$_2$, wherein M represents a cation such as an alkali metal, an alkaline earth metal, and a quaternary ammonium salt, R represents H, or a hydrocarbon group having 8 or less carbon atoms, and $A^-$ represents an anion such as an anion of halogen atom. Further, of these groups, —OH is particularly preferred. Optional numbers of the polar substituent may be incorporated in a molecule.

The sliding agent is molecularly disposed on the surface of a magnetic recording-layer side so as to reveal a sliding property. Specific examples of these compounds are illustrated below. But, the present invention is not restricted to them.

(5-1) HOCO(CH$_2$)$_{10}$COOC$_{21}$H$_{43}$
(5-2) C$_{17}$H$_{35}$COOCH$_2$CH(OH)C$_{12}$H$_{25}$
(5-3) C$_9$H$_{19}$C(OH)(C$_9$H$_{19}$)CH$_2$COOC$_{25}$H$_{51}$
(5-4) C$_6$H$_{13}$CH(OH)(CH$_2$)$_{10}$COOC40CH$_{61}$
(5-5) C$_{14}$H$_{29}$CH(NH$_2$)COO(CH$_2$)$_n$CH(CH$_3$) —(CH$_2$)$_m$—CH$_3$(n+m=15)
(5-6) CH, (CH$_2$)$_2$ COH (COONa)(CH$_2$)$_6$ COOC$_{40}$ H a
(5-7) HOCH$_2$(CH$_2$)$_6$CH(OH)CH(OH)(CH$_2$)$_4$COO —C$_{50}$H$_{101}$ (5-8) $CO_{17}H_{33}COO(C H_2)_{16}OH$ (5-9) $CH_3(CH_2)_2CH(OH)(CH_2)_6 CONHC_{21}H_{42}$ (5-10) $C7H_{15}—\Phi—COOCH (CONH_2)C_{16}H_{33}$ (5-11) $C_{27}H_{55}COOCH_2CH(OH)CH_2OH$ (5-12) $HOCO(CH_2)_5COOC_{40}H_{81}$ (5-13) $CH_3(CH_2)_{15}CH (SO_3Na) COOCH_2CH (C_{13}H_{27})—C_{10}H_{21}$ (6-1) $C_{14}H_{29}CHCOO(CH_2)_5OCOCH (OH) C_{14}H_{29}$ (6-2) $C_{10}H_{21}COOCH (C_1H_5) (CH_2)_7CH (C_2H_4COOH)—O—OCOC_{10}H_{21}$ (6-3) $NaOCO (CH_2)_{11}COO (CH_2)_{10}OCO (CH_2)_{11}—COOH$ (6-4) $C_9H_{19}C (OH)(C_9H_{19}) CH_2COO (CH_2)_{15}CONH—C_{10}H_{21}$ (6-5) $H_2NCO (CH_2)_{10}COOCH (C_6H_{13})(CH_2)_{10}COO—C_{30}H_{61}$ (6-6) $C_{14}H_{29}CH (N^+(CH_3)_4Cl^-)COO (CH_2)_{10}OCO—C_{17}H_{33}$ (6-7) $C_6H_{13}CH (OH)(CH_2)_{10}COO (CH_2)_8OCO —(CH_2)_{10}CH (OH) C_6H_{13}$ (6-8) $C_{15}H_{31}COOCH_2CH(OH) CH_2OCOC_{15}H_{31}—C_8H_{17}NHCO (CH_2)_{10}COO (CH_2)_{15}OH$ (6-9) $C_{40}H_{81}OCO (CH_2)_5COO (CH_2)_5COOH$ (6-10) $\underline{C}H_3(CH_2)_{15}CH (SO_3Na)COO(CH_2)_2 CH(CH_3)—(CH_2)_2 OCOC_{17}H_{35}$ (6-11) $HOCH_2CH(OH) CH_2OC (CH_2)_3 CH(C_2H_5)—(CH_2)_9COOC_{50}H_{101}$ Because the compounds represented by the above-mentioned formulae have a high hydrophobic property, many of them have a poor solubility to a solvent. Therefore, there are available a method for dissolving a compound in a non-polar organic solvent such as toluene and xylene, or a method for dispersing a compound in a coating solution. Of these methods, the dispersion method is preferred because the non-polar organic solvent is difficult to handle. At this time, any kind of dispersing agents may be used, unless they deteriorate a sliding property and a scratch-resisting property. Preferable examples of the dispersing agent include compounds represented by formula (3) described below.

$$R^6YBD \qquad \text{Formula (3)}$$

In formula (3), $R^6$ represents an aliphatic hydrocarbon group having 25 to 70 carbon atoms. The hydrocarbon group may have an unsaturated bond, may have a various kind of substituents, or may contain a branched structure. A straight-chain aliphatic hydrocarbon group is particularly preferred for the sliding property and the scratch-resisting property. The number of carbon atoms of the hydrocarbon group is preferably from 25 to 70. In the case of the hydrocarbon group having less than 25 carbon atoms, such problems arise that a sufficient sliding property and scratch-resisting property is hardly revealed, and that the sliding property is deteriorated after a processing. Further, as a hydrocarbon compound having 70 or less carbon atoms with one terminal modified by a functional group, are known long-chain aliphatic alcohols having straight- or branched-chain, and the like. However, almost none of compounds having more than 70 carbon atoms generally have been known, except for especially synthesized compounds. Particularly preferred carbon atom numbers are from 30 to 60.

Further, Y represents a divalent linking group. Specific examples thereof include $—C(O)O—$, $—OCO—$, $—C(O)NR'—$, $—NR'CO—$, $—SO_2NR'—$, $—NR'SO_2—$, $—O—$, $—S—$, $—NR—$, $—OCOR"COO—$, and $—OCOR"O—$, wherein R' represents H or a hydrocarbon group having 8 or less carbon atoms, and R" represents a hydrocarbon group having from 0 to 8 carbon atoms).

Further, B is composed of any one of the units consisting of $—(CH_2CH_2O)_a—$, $—(CH_2CH(OH)CH_2O)_b—$, $—((CH_2)_cCH(R)CH_2O)_d—$, and $—(CH_2CH_2O)_e—(CH_2CH(OH)CH_2O)_f—((CH_2)_cCH(R)CH_2O)_g—$, wherein a is from 3 to 40, each of b and d is from 3 to 30, c is from 1 to 3, e is from 0 to 40, each of f and g is from 0 to 30, e+f+g is from 3 to 40, and R represents H, $CH_3$, or a phenyl group. When the length of these nonionic groups is shorter than the above-described range, a sufficient solubility of the sliding agent, or a sufficient dispersion stability thereof in the case of the dispersion, is hardly attained. On the other hand, when the length thereof is longer than the above-described range, such problems arise that a sufficient sliding property and scratch-resisting property is not revealed, and that a deterioration of the sliding property with the lapse of time after a processing occurs. Of these nonionic groups, $—(CH_2CH_2O)_a—$ is particularly preferred, wherein a is preferably from 5 to 30. D represents an end (terminal) group such as a hydrogen atom and an alkyl group.

These polyether-containing compounds for use in the present invention can be easily synthesized by, for example, a successive addition reaction of the corresponding higher alcohol with an ethylene oxide according to an ordinary method, or a dehydration condensation of the corresponding dicarboxylic acid with the above-mentioned higher alcohol polyether adduct, or a condensation of the above-mentioned higher alcohol polyether adduct with a higher carboxylic acid.

A ratio of the dispersing agent represented by formula (3) to the sliding agent represented by formula (1) or (2), to be used, is preferably from 1:9 to 9:1, and preferably from 6:4 to 2:8. Further, a dispersion method of the sliding agent is described later.

Specific examples of the compounds represented by formula (3) are shown below.

(7-1) $n\text{-}C_{30}H_{61}O(CH_2CH_2O)_{10}H$ (7-2) $n\text{-}C_{40}H_{81}O(CH_2CH_2O)_{15}H$ (7-3) $n\text{-}C_{50}H_{101}O(CH_2C_2O)_{16}H$ (7-4) $n\text{-}C_{50}H_{101}O(CH_2CH_2O)_{30}H$ (7-5) $n\text{-}C_{40}H_{81}O(CH_2CH_2O)_{10}H$ (7-6) $n\text{-}C_{50}H_{101}(CH_2CH_2O)_{16}H$ (7-7) $n\text{-}C_{50}H_{101}—(CH (CH_3)CH_2O)_3(CH_2CH_2O)_{16}H$ (7-8) $n\text{-}C_{50}H_{101}—(CH_2CH(OH)CH_2O)_3—(CH(OH)CH_2O)_3—(CH_2CH_2O)_{15}H$ (7-9) $n\text{-}C_{40}H_{81}OCOCH_2CH_2COO (CH_2CH_2O)_{16} H$ (7-10) $n\text{-}C_{50}H_{101}OCOCH=CHCOO (CH_2CH_2O)_{16}H$ (7-11) $n\text{-}C_{50}H_{101}OCOCH_2CH_2COO—(CH_2CH(OH)CH_2O)_3—(CH_2CH_2O)_{15}H$ Next, the spherical inorganic particles having a Mohs' hardness of 6 to 8 for use in the present invention are described in detail.

Silica (silicon dioxide) and titanium dioxide are exemplified as the spherical inorganic particles having a Mohs' hardness of 6 to 8 for use in the present invention 20 in order to effectively remove from a magnetic head, a very highly adhesive and cumulative stain such as a dried solid of the developing solution. The particles having a Mohs' hardness of less than 6 are of a low ability to remove the above-described highly adhesive stain. On the other hand, the particles having a Mohs' hardness of 9 or more (e.g., α-alumina particles) excessively abrades the magnetic head and shorten a life of the head, so that a large amount of the particles can not be used. Therefore, these particles are excluded from the group of the inorganic particles for use in the present invention. However, a small amount of the α-alumina particles is preferably used in a magnetic recording medium of the present invention, in order to get rid of a scratch that occurs on the surface of a magnetic head by a surrounding dust, sand, and the like, being caught during a running of the medium, to thereby keep the surface of the magnetic head a mirror plane at all times. The α-alumina may be contained in any of a magnetic recording layer-coating, solution, or an upperlayer thereof-coating solution. However, in order to exhibit an effect of the alumina, it is preferred to select a particle size and a coating method so that the height of protrusion of the alumina particles is higher than those of spherical inorganic particles and spherical organic high molecular (polymer) particles.

With respect to inorganic particles for use in the present invention, it is preferred that a grain size distribution is sharp, from a view point that a stain adhered onto a magnetic head can be instantly and effectively removed because inorganic particles uniformly protrude from the surface of a medium. The said inorganic particles may be crystalline or noncrystalline in a practical use. The noncrystalline particles are preferred from the view point that a grain size distribution thereof is sharp. However, the present invention should not be limited to the use of noncrystalline particles. Further, of these inorganic particles, silica is especially preferred from the view point of adsorption reactivity with a silane coupling agent.

Besides spherical inorganic particles for use in the present invention to remove a stain adhered onto a magnetic head, spherical organic high molecular particles are preferably used in combination with the spherical inorganic particles so as to maintain a spacing from a magnetic head, and to thereby prevent a stain from adhering onto the magnetic head. Examples of spherical organic high-molecular particles include resin particles, such as methacrylic resin, polystyrene, polysiloxane, melamine resin, benzoguanamine resin, polytetrafluoroethylene, cellulose acetate, polycarbonate, and polyamide (nylon). Preferred of these materials are poly(methyl methacrylate), polysiloxane, polystyrene, melamine resin, and benzoguanamine resin, and composite thereof. Further, the particles may be particles made by coating organic high-molecular particles on an inorganic particle.

Alternatively, the organic high-molecular particles may be particles finely grained by various means, such as suspension polymerization, a spray-dry method, or a dispersion method, using a homopolymer or a copolymer derived from a single monomer, or at least two kinds of monomers, such as acrylic acid esters, methacrylic acid esters, itaconic acid diesters, crotonic acid esters, maleic acid diesters, phthalic acid diesters, styrene derivatives, vinyl esters, acryl amides, vinyl ethers, allyl compounds, vinyl ketones, vinyl heterocyclic compounds, acrylonitrile, methacrylonitrile, and multi-functional monomers.

In order to secure sufficient magnetic input/output capability, organic high molecular particles are not necessarily used, if a primary grain size of the above-mentioned spherical inorganic particles is suitably selected, because both an ability to remove a stain from the magnetic head, and a spacing from the magnetic head, are secured. For example, when a magnetic recording medium is used as a photographic element, even though the surface of the magnetic recording layer side (the surface of the spherical inorganic particles-coating side) is slid against the surface of the light-sensitive silver halide emulsion layer side opposite thereto in a cartridge when a film is taken in and out of the cartridge, the surface of the emulsion layer side is rendered less damageable, because the particles that contact the surface of the emulsion layer side are spherical organic high molecular particles having a low hardness, by selecting an average grain size of spherical organic high molecular particles that is larger than the size of spherical inorganic particles. Due to this advantage, the spherical organic high molecular particles are preferably used in a combination with the spherical inorganic particles.

Further, as a part of or all of a solvent of the coating solution for a layer containing the above-said spherical inorganic particles, or the above-said spherical organic high molecular particles, is used a solvent capable of dissolving an under layer of the above-said layer (in the present invention, a binder of the transparent magnetic recording layer, for example, diacetyl cellulose), and thereby the above-described particles can be buried in the part of the under layer, so that the height of the protrusion becomes extremely uniform. It was found that the uniformity obtained by the above-described method is much excellent, compared to that obtained by incorporating the above-said particles in a transparent magnetic recording layer. Therefore the above described method is extremely advantageous to the compatibility of magnetic input/output capability and transparency. At this time, it is preferred that each of the particles has been buried in the proportion of 50% or more, and more preferably 60% or more, based on its volume, in order to prevent the particles from falling off. On the other hand, it is preferred that each of them is not buried in the proportion of 80% or more, based on its volume, in order to ensure both a sufficient cleaning function and a spacing function not to adhere a stain onto the head. It is preferred that the grain size distribution of the above-said spherical particles is sharp, because a pressure dispersion can be performed under a pressure caused by, for example, counter rollers, and sinking down of the particles is lessened, so that a spacing from the head can be widely maintained.

Specific examples of the spherical inorganic particles, the spherical organic high molecular particles and the α-alumina particles for use in the present invention, include materials as described below. But, the present invention is not restricted to them. The following materials shown by hook-shaped parentheses each mean a trade name.

(Spherical inorganic particle)

"Seahostar KEP 30", "Seahostar KEP 50", "Seahostar KEP 70", "Seahostar KEP 90", "Seahostar KEP 100", all of which are manufactured by Nippon Shokubai Co., Ltd The above are amorphous silica.

(Spherical organic high-molecular particle)

"Tospearl 105, " "Tospearl 108, " and "XC99-A8808," all of which are manufactured by Toshiba Silicone Co., Ltd. The above are polysiloxane particles. "MX-100" and "MX-150," both of which are manufactured by Soken Chemical & Engineering Co., Ltd.; "P-1430" and "P-5000", both of which are manufactured by Nippon Paint Co., LTD. The above are PMMA particles.

"Epostar S12", and "Epostar S6," both of which are manufactured by Nippon Shokubai Co., Ltd. The above are melamine resin particles.

Specific examples of α-alumina are illustrated below. "AKP 30," "AKP 20," "AKP 15," "AKP 10," "Sumicorundum AA-1.5," "Sumicorundum AA-1.0," "Sumicorundum AA-0.7," "Sumicorundum AA-0.5," and "HIT 50," all of which are manufactured by Sumitomo Chemical Co., Ltd.; "ERC-DBM," manufactured by Reynolds Co., Ltd., and "Norton-E 600," manufactured by Norton Co., Ltd.

The α-alumina may be added to a magnetic substance-containing layer, or a higher fatty acid ester sliding agent-containing layer, or both layers. The addition to the magnetic substance-containing layer is more preferred.

Further, in order to lessen a stain of the head and an error in magnetic input/output, it is preferred to contain fine inorganic particles having a grain size of from 1 nm to 50 nm in a coating amount of from 10 mg/m$^2$ to 200 mg/m$^2$, in addition to the above-described spherical inorganic particles and spherical organic high molecular particles. These fine inorganic particles are bearing a role (function) that they finely divide a stain of the developing solution (a deposit), and they make the stain small in size rather than they form a spacing from a magnetic head, which the above-mentioned spherical inorganic particles and spherical organic high molecular particles provide, and thereby they prevent the stain from contacting with the magnetic head. The grain size of the fine inorganic particles is preferably from 5 nm to 40 nm, and more preferably from 10 nm to 30 nm. When the grain size is more than 50 nm, the transparency reduces. On the other hand, the particles having a grain size of less than 1 nm is difficult to use in the industry.

Examples of inorganic particles whose average primary particle diameter is from 1 nm to 50 nm, include γ-alumina, θ-alumina, titanium dioxide, colloidal silica, and the like. In view of dispersion stability, colloidal silica is preferable. In the present invention, these small particles are used to form minute protuberances on the surface of a magnetic layer to finely divide stain caused by a processing solution, and therefore, other particles besides the above-mentioned particles can be used in order to attain the object of the present invention. Specific examples of the small particles are illustrated below.
(γ-alumina)
"AKP-G015" (trade name) manufactured by Sumitomo Chemical Co., Ltd.
(θ-alumina)
"AKP-G008" (trade name) manufactured by Sumitomo Chemical Co., Ltd.
(Titanium dioxide)
"Idemitsu Titania" (trade name) manufactured by Idemitsu Petrochemical Co., Ltd.
(Colloidal silica)
"MEK-ST", "MIBK-ST", "Methanol Silica Sol", "MA-ST-M", and "IPA-ST" (trade names), all of which are manufactured by Nissan Chemical Industries, Ltd.

The thickness of a magnetic recording layer is generally from 0.3 μm to 1.5 μm, and preferably from 0.5 μm to 1.2 μm.

A thickness of the higher fatty acid ester layer which is overlaid upon the magnetic recording layer, is from 0.01 μm to 0.5 μm, preferably from 0.01 μm to 0.1 μm, and more preferably from 0.01 μm to 0.05 μm.

Further, preferably a thickness of the magnetic recording layer is designed so as to become 50% or more compared with the grain size of the particles to be used, so that the magnetic recording layer fully holds spherical inorganic particles and spherical organic high molecular particles.

The refractive index of the particles for use in the present invention is not particularly limited. However, the difference of its the refractive index between the particles and the layer containing the particles, is preferably not more than 0.08, more preferably not more than 0.04, and still more preferably not more than 0.02, from the point that transparency of the medium, such as haze, can be improved.

It is industrially preferred that spherical inorganic particles, spherical organic high molecular particles, α-alumina abrasives, and the like, are prepared as a dispersion solution thereof, respectively, and they are added to the final coating solution, followed by agitation and preparation. Further, a dispersion solution can be produced by selecting the same dispersion method (dispersing machine, etc.) as a magnetic substance hereinafter described.

When a magnetic recording medium of the present invention is provided on a photographic film, the degree of haze of all layers coated on the side of a magnetic recording layer, is preferably less than 9%, and more preferably less than 8%. The transparent magnetic recording layer means a magnetic recording layer that exhibits transparency on a level that does not substantially affect the photographic image quality. Further, the transparent layer herein referred to generally provides 0 to 0.2, preferably from 0 to 0.15, and more preferably from 0 to 0.12, in terms of blue-filter transmission density.

Examples of magnetic grains that can be contained in a transparent magnetic recording layer for use in the present invention, include ferromagnetic iron oxide, such as γ-Fe$_2$O$_3$ (FeO$_x$, $4/3<x\leq3/2$), Co-coated ferromagnetic iron oxide, such as Co-coated γ-Fe$_2$O$_3$ (FeO$_x$, $4/3<x\leq3/2$), Co-coated magnetite, and further Co-doped ferromagnetic iron oxide, Co-doped magnetite, ferromagnetic chromium dioxide, ferromagnetic metal, ferromagnetic alloy, and other magnetites and ferrites, e.g. hexagonal system Ba ferrite, Sr ferrite, Pb ferrite, and Ca ferrite, and a solid solution of these substances or ion substitutes of these substances.

The shape of the ferromagnetic substance may be any of an acicular shape (needle-like), a rice-grain-like shape, a spherical shape, a cubic shape, and a plate-like shape. Among these, a needle-like ferromagnetic substance is preferred from a viewpoint of electromagnetic conversion characteristics. Turning to the particle size, when the magnetic substance is needle-like, the particle size (the length of the longer axis) is preferably from 0.01 μm to 0.5 μm, and the ratio of the longer axis to the shorter axis is preferably from 50:1 to 2:1, and more preferably the length of the longer axis is from 0.1 μm to 0.35 μm, and the ratio of the longer axis to the shorter axis is from 20:1 to 3:1. The specific surface area of the particle is preferably not less than 30 m$^2$/g, and particularly preferably not less than 40 m$^2$/g, in terms of $S_{BET}$. The particle size distribution of the magnetic substance is preferably as sharp as possible, from viewpoints of magnetic property and haze. The saturation magnetization (σs) of the ferromagnetic substance is preferably not less than 50 emu/g, and more preferably not less than 70 emu/g. Further, the rectangularity (squareness) ratio (σr/σs) of the ferromagnetic substance is preferably not less than 40%, and more preferably not less than 45%. The coercive force (Hc) is generally from 200 Oe to 3000 Oe, and preferably from 500 Oe to 2000 Oe.

The content of the magnetic particles in a magnetic recording layer is preferably from 10 mg/m$^2$ to 100 mg/m$^2$, from a viewpoint of the balance between magnetic reading power (efficiency) and transparency.

These ferromagnetic particles may be subjected to surface treatment with silica and/or alumina, as those described in, for example, JP-A-59-23505 and JP-A-4-096052. Alternatively, they may be subjected to surface treatment with inorganic and/or organic material, as described, for example, in JP-A-4-195726, JP-A-4-192116, JP-A-4-259911, and JP-A-5-081652. Further, the surface of these ferromagnetic particles may be treated with a silane coupling agent or a titanium coupling agent. Specific examples of the coupling agent to be used include 3-mercaptopropyl trimethoxysilane, 3-isocyanylpropyl methyldimethoxysilane, 3-(poly(degree of polymerization 10)oxyethynyl)oxypropyl trimethoxysilane, 3-methoxy (poly (degree of polymerization 6) oxyethynyl)oxypropyl trimethoxysilane, and decyltrimethoxy silane. The amount of these silane coupling agents and titanium coupling agents to be added to the magnetic particles, is generally from 1.0 to 200 wt %, preferably from 1 to 75 wt %, and more preferably from 2 to 50 wt %. Further, these silane coupling agents and titanium coupling agents may be treated according to a direct processing method for the magnetic particles, or alternatively an integral blend'method. The direct processing method is a general term (name) for a dry process, a slurry process (method), and a spray process (method). A preferable embodiment according to the dry process is that magnetic particles and a small amount of water or an organic solvent, or magnetic particles and an organic solvent containing water, and a coupling agent are mixed, and then the water and/or the organic solvent are removed from the resultant mixture by means of an open-type kneader with stirring, followed by fine dispersion.

Preferred among methods of dispersing the above-described magnetic substance in a binder (hereinafter described), are a kneader, a pin-type mill, and an annular-type mill, and the like. The combined use of a kneader and a pin-type mill, or the combined use of a kneader and an annular-type mill, is also preferred. The kneader is a general term (name) for open-type, closed-type, and continuation (succession)-type kneaders. Alternatively, other kneaders, such as a three roll mill and a laboplastmill, can also be used. A dispersion by means of a micro fluidizer is also preferably applied.

The coercive force of the magnetic recording layer is generally from 500 Oe to 3000 Oe, and preferably from 800 Oe to 1500 Oe.

A magnetic recording layer can be provided with a stripe pattern, or the layer is provided all over the surface, on the back surface of the photographic support against the photographic light-sensitive. The magnetic recording layer, having been coated on a support, is subjected to a processing for orientation, during the drying of magnetic materials in the layer instantly after the coating, if necessary, and then the resulting magnetic recording layer is dried. Methods of using a permanent magnet or a solenoid coil can be used for orientation of the magnetic substance. The strength of the permanent magnet is preferably not less than 2000 Oe, and particularly preferably not less than 3000 Oe. On the other hand, the strength of the solenoid coil may be 500 Oe or more. Further, the timing of the orientation at the drying step is preferably a specific point at which an amount of the solvent remaining in a magnetic recording layer reaches the range of from 5% to 70%.

A binder for layers, including a magnetic recording layer for use in the present invention, and the like, is described below. The following can be used as the binder for use in the present invention: thermoplastic resins, thermosetting resins, reactive-type resins; polymers having an acid or alkali decomposability, or a biodegradability; natural polymers (e.g. cellulose derivatives, sugar derivatives), and a mixture thereof. The glass transition temperature, Tg, of the above resins is preferably from −40° C. to 300° C., and the weight-average molecular weight is preferably from 2,000 to 1,000,000, more preferably from 5,000 to 300,000.

Further, among binders that constitute a magnetic recording layer, cellulose esters whose substitution degree is from 1.7 to 2.9, are preferably used. Cellulose diacetate, cellulose acetate butylate, and cellulose acetate propionate are particularly preferred.

The following polar group may be introduced into the above-described binder: an epoxy group, $CO_2M$, OH, $NR_2'NR_3^+X^-$, $SO_3M$, $OSO_3M$, $PO_3M_2$, or $OPO_3M_2$, wherein M represents a hydrogen atom, an alkali metal, or an ammonium, with the proviso that when the group contains two or more Ms, they are the same or different; R represents a hydrogen atom or an alkyl group, and X represents a halogen atom.

The above-listed binders may be used singly or in a mixture thereof, and they may contain crosslinking agents such as epoxy-, aziridine-, and isocyanate-series crosslinking agents. By using crosslinking agents, it is possible to strengthen the adhesion of layer itself or adhesion between layers. The isocyanate-series crosslinking agents include polyisocyanate compounds having two or more isocyanate groups, with examples including isocyanates, such as tolylene diisocyanate, hexamethylene diisocyanate, xylylene diisocyanate, naphthalene-1,5-diisocyanate, o-toluidine diisocyanate, isophorone diisocyanate, and triphenylmethane diisocyanate; reaction products of these isocyanates and polyalcohols (e.g. a reaction product of tolylene diisocyanate (3 mol) and trimethylol propane (1 mol)); and polyisocyanates produced by the condensation of these isocyanates. Among the above crosslinking agents, isocyanate-series crosslinking agents represented by the following formula (4) are particularly preferable.

formula (4):

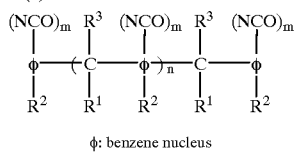

φ: benzene nucleus

In the formula (4), n is preferably in the range of 1 to 50, more preferably from 0 to 30, and further preferably from 0 to 10. The number of n is not necessarily single, but may have a distribution. φ represents a benzene ring. m is an integer of 1 or 2. $R^1$, $R^2$, and $R^3$ each represent a hydrogen atom, an alkyl group (having 1 or more carbon atoms), or an aryl group (having 6 or more carbon atoms).

The viscosity of the crosslinking agent is preferably from 50 (cP/25° C.) to 1000 (cP/25° C.). Further, the NCO content of the crosslinking agent is preferably from 20 to 40%, and more preferably from 25 to 35%. Examples of commercially available products of the crosslinking agent include "Millionate MT,""Millionate MR-100," "Millionate MR-200," "Millionate MR-300," and "Millionate MR-400" (trade names, manufactured by Japan Polyurethane Co., Ltd.), and "Sumidur 44V10" (trade name, manufactured by Sumitomo Bayer Urethane Co., Ltd.).

The coating amount of the above crosslinking agent is preferably from 3 mg/m² to 1000 mg/m², more preferably from 5 mg/m² to 500 mg/m², and further preferably from 10 mg/m² to 300 mg/m². In order to sufficiently form bridge formation using the crosslinking agent, it is preferable to heat and dry at 50° C. or more, more preferably 70° C. or more, for 1 min to 72 hrs.

When use is made of the above crosslinking agent, in combination with at least one of a tertiary amine-series, a metal salt-series, and a DBU (1,8-diaza-bicyclo[5.4.0] undecene-7)-series compound at the same time, is able to accelerate the crosslinking reaction speed of the layer per se (the layer containing the crosslinking agent), or between the layer and a layer adjacent therewith, whereby the crosslinking reaction time for improvement of durability can be shortened. Examples of the tertiary amine-series compound include tetramethylbutanediamine, 1,4-diazabicyclo[2.2.2] octane, and triethylamine, as described by Bruins et al., in Polyurethane Technology, p.25, Interscience (1960). Further, examples of the metal salt-series compound include dibutyltin dilaurate, tin caprylate, cobalt naphthenate, stannous chloride, tetra-n-butyl tin, stannic chloride, trimethyl tin hydroxide, and dimethyl tin dichloride. These compounds may be added, for example, to a coating solution for a magnetic recording layer, in combination with the above crosslinking agent, followed by coating the thus-obtained coating solution onto a support. Additionally, or alternatively, these compounds may be added to a coating solution for an under layer and/or an upper layer to be coated below or above a magnetic recording layer, so that these compounds can be diffused to the magnetic recording layer.

Examples of the film support for use in the present invention include triacetylcellulose (TAC), polyamides, polycarbonates, and polyesters. Preferred materials are polyesters. The preferable average molecular weight of these polyesters is within the range of about 5,000 to 200,000. Of these polyesters for use in the present invention, preferred are those having a glass transition temperature (Tg) in the range of generally from 70° C. to 170° C., preferably from 90° C. to 150° C. Specific examples of polyesters that can be used in the present invention include the following compounds.

Examples of Polyester Compounds

| | | |
|---|---|---|
| P-1: | [Terephthalic acid (TPA)/Ethylene glycol (EG) (100/100)] (PET) | Tg = 80° C. |
| P-2: | [2,6-Naphthalenedicarboxylic acid (NDCA)/ Ethylene glycol (EG) (100/100)] (PEN) | Tg = 119° C. |
| P-3: | 2,6-NDCA/TPA/EG (50/50/100) | Tg = 92° C. |
| P-4: | PEN/PET (60/40) | Tg = 95° C. |
| P-5: | PEN/PET (80/20) | Tg = 104° C. |

Preferable polyesters are those containing 2,6-naphthalenedicarboxylic acid as a constituting member, in which 2,6-naphthalenedicarboxylic acid is contained in an amount of not less than 10 mol % of all dicarboxylic acids in constituting members. Polyethylene-2,6-naphthalenedicarboxylate is particularly preferred of all. Further, the thickness of a support is preferably from 80 μm to 115 μm, and particularly preferably from 85 μm to 105 μm. Further, a polyester support, prior to coating a light-sensitive layer thereon, may be subjected to heat treatment at a temperature ranging from 40° C. to glass transition temperature, for a period of from 0.1 to 1500 hours, whereby core-set curl can hardly occurs for the roll-formed light-sensitive material.

A plasticizer, such as triphenyl phosphate, biphenyldiphenyl phosphate, and dimethylethyl phosphate, is usually added in TAC support. The support may contain a dye for various purposes of neutralization of base coloring, light-piping prevention, and antihalation. These supports may be subjected to a surface treatment, in order to achieve strong adhesion between the support and a photographic constituting layer (e.g. a light-sensitive silver halide emulsion layer, an interlayer, a filter layer, a magnetic recording layer, an electrically conductive layer), and then a photographic emulsion is coated directly onto the support. For the above-mentioned surface treatment, various surface-activation treatments can be used, such as a chemical treatment, a mechanical treatment, a corona discharge treatment, a flame treatment, an ultraviolet ray treatment, a high-frequency treatment, a glow discharge treatment, an active plasma treatment, a laser treatment, a mixed acid treatment, and an ozone oxidation treatment. Alternatively, once the support is subjected to the above-described surface treatment, or if the surface treatment is omitted, then a subbing layer may be coated on the support, followed by a coating of a photographic emulsion layer on the subbing layer. These surface treatments can be conducted according to the known methods.

Further, a transparent magnetic recording medium of the present invention may contain other additives, such as a dye and a surfactant. Further, a silicon-series compound and/or a fluorine-series compound (a fluorine-containing compound) are preferably incorporated in at least one of layers on the side of the transparent magnetic recording layer of a transparent magnetic recording medium of the present invention. This is because stain (deposit) hardly adheres to the surface of the medium, and consequently stain hardly transfers to a magnetic head, which results in less magnetic input/output trouble. Specific examples of these compounds include FC-431 (trade name, manufactured by Sumitomo 3M Co., Ltd.). Preferable examples of a lubricant (a sliding agent) for use in a transparent magnetic recording medium of the present invention, are higher fatty acid esters (esters obtained from a fatty acid having 10 to 24 carbon atoms and an alcohol having 10 to 60 carbon atoms).

Preferred examples of the magnetic recording media according to the present invention, include a color reversal film and a color nega film, both of which contain a light-sensitive silver halide layer. Color nega films for general use are particularly preferred. The silver halide emulsion is generally subjected to physical ripening, chemical ripening, and spectral sensitization, for practical use. The present invention particularly remarkably exhibits its effects when the emulsion sensitized with both a gold compound and a sulfur-caining compound is used. Additives that can be used in these steps are described in Research Disclosure Nos. 17643 and 18716, and the corresponding passages are listed below.

Known photographic additives that can be used in the present invention are also described in the above-mentioned two Research Disclosures, and involved sections are listed in the same Table below.

| | Additive | RD 17643 | RD 18716 |
|---|---|---|---|
| 1 | Chemical sensitizers | p. 23 | p. 648 (right column) |
| 2 | Sensitivity-enhancing agents | — | p. 648 (right column) |
| 3 | Spectral sensitizers and Supersensitizers | pp. 23–24 | pp. 648 (right column)–649 (right column) |
| 4 | Brightening agents | p. 24 | |
| 5 | Antifogging agents and Stabilizers | pp. 24–25 | p.649 (right column) |
| 6 | Light absorbers, Filter dyes, and UV Absorbers | pp. 25–26 | pp. 649 (right column)–650 (left column) |
| 7 | Stain-preventing agents | p. 25 (right column) | p. 650 (left to right column) |
| 8 | Image dye stabilizers | p. 25 | |

-continued

|   | Additive | RD 17643 | RD 18716 |
|---|---|---|---|
| 9 | Hardeners | p. 26 | p. 651 (left column) |
| 10 | Binders | p. 26 | p. 651 (left column) |
| 11 | Plasticizers and Lubricants | p. 27 | p. 650 (left column) |
| 12 | Coating aids and Surfactants | pp. 26–27 | p. 650 (right column) |

The present invention can provide a transparent magnetic recording medium that is excellent in having both secure magnetic input/output capability and transparency, and a silver halide photographic light-sensitive material having this transparent magnetic recording medium.

The present invention is described in more detail with reference to the following examples, but the present invention is not limited thereto.

EXAMPLES

1) First Layer and Subbing Layer

A glow discharge treatment was conducted to both surfaces of a polyethylene naphthalate support of 90 μm thickness, at the conditions of processing atmosphere pressure, 0.2 Torr; $H_2O$ partial pressure in atmosphere, 75%; discharge frequency, 30 kHz; output, 2500 W; and processing strength, 0.5 kV·A·min/m². A coating solution having the formulation shown below, was coated, as the first layer, onto the above-said support, in a coated amount of 5 cc/m², according to the bar method described in JP-B-58-4589.

| | |
|---|---|
| Dispersion solution of electrically conductive fine particles (aqueous dispersion solution having 10% density of $SnO_2/Sb_2O_5$ particles. Secondary aggregate, whose average particle diameter was 0.05 μm, composed of particles whose primary particle diameter was 0.005 μm.) | 50 weight parts |
| Gelatin | 0.5 weight part |
| Water | 49 weight parts |
| Polyglycerol polyglycidyl ether | 0.16 weight part |
| Polyoxyethylene sorbitan mono-laurate (polymerization degree 20) | 0.1 weight part |

Further, after the first layer was coated on the support, the resultant support was wound round a stainless reel 20 cm in diameter, followed by heat treatment at 110° C. (Tg of the PEN support: 119° C.) for 48 hours, in order to give the support thermal hysteresis and subject it to an annealing treatment. Subsequently, a coating solution having the formulation shown below, was coated using a bar coating, in a coating amount of 10 cc/m², as a subbing layer for a silver halide emulsion, opposite to the surface of the support having coated thereon the first layer.

| | |
|---|---|
| Gelatin | 1.01 weight part |
| Salicylic acid | 0.30 weight part |
| Resorcin | 0.40 weight part |
| Poly(polymerization degree 10)oxyethylene nonylphenylether | 0.11 weight part |
| Water | 3.53 weight parts |
| Methanol | 84.57 weight parts |
| n-Propanol | 10.08 weight parts |

Further, the second layer and the third layer as described below were successively coated on the first layer, and finally a color nega light-sensitive material described below was multi-layer coated on the opposite side, to prepare a transparent magnetic recording medium having a silver halide emulsion layer.

2) Second Layer (transparent magnetic recording layer)

① Dispersion of magnetic substance

To an open-type kneader, 1100 weight parts of Co-coated γ-$Fe_2O_3$ magnetic substance (average length of the longer axis, 0.25 μm; $S_{BET}$, 39 m²/g; Hc, 831 Oe; σs, 77.1 emu/g; θr, 37.4 emu/g), 220 weight parts of water, and 165 weight parts of the silane coupling agent [3-(poly(polymerization degree 10)oxyethynyl)oxypropyl trimethoxysilane] were added, and this mixture was well kneaded for 3 hours. The thus coarsely dispersed viscous solution was dried at 70° C. for 24 hours, to remove water. After that, the resultant dry powder was further subjected to heat treatment at 110° C. for 1 hour, to prepare surface-treated magnetic particles.

Further, a mixture having the following formulation was again kneaded in an open-type kneader for 4 hours:

| | |
|---|---|
| The above-described surface-treated magnetic particles | 855 g |
| Diacetyl cellulose | 25.3 g |
| Methyl ethyl ketone | 136.3 g |
| Cyclohexanone | 136.3 g |

Further, a mixture having the following formulation was finely dispersed by means of a sand mill (¼ G), at the rate of 2000 rpm, for 4 hours. As a media, glass beads having a diameter of 1 mmφ were used.

| | |
|---|---|
| The above-described kneaded solution | 45 g |
| Diacetyl cellulose | 23.7 g |
| Methyl ethyl ketone | 127.7 g |
| Cyclohexanone | 127.7 g |

Further, a magnetic substance-containing intermediate solution was prepared according to the following formulation.

② Preparation of magnetic substance-containing intermediate solution

| | |
|---|---|
| The above-described magnetic substance finely dispersed solution | 674 g |
| Diacetyl cellulose solution (solid content 4.34%, solvent: methyl ethylketone/cyclohexanone = 1/1) | 24280 g |
| Cyclohexanone | 46 g |

These were mixed and then stirred by a Disper, to prepare "the magnetic substance-containing intermediate solution".

α-alumina abrasive dispersion solution for use in the present invention, was prepared according to the following formulation.

[a] Sumicorundum AA-1.5 (average primary particle diameter of 1.5 μm, specific surface area of 1.3 m$^2$/g)

Preparation of particle dispersion solution

| | |
|---|---|
| Sumicorundum AA-1.5 | 152 g |
| Silane coupling agent KBM 903 (trade name, manufactured by Shinetsu silicone Co.) | 0.48 g |
| Diacetyl cellulose solution (solid content 4.5%, solvent: methyl ethylketone/cyclohexanone = 1/1) | 227.52 g |

The mixture having the above formulation was finely dispersed by means of a sand mill (¼ G, sand mill in which both the interior of the vessel and the rotary disc had been processed with ceramic coating), at the rate of 800 rpm, for 4 hours. As a media, glass beads having a diameter of 1 mmφ were used.

[b] Colloidal Silica Particle-dispersed Solution (fine particles)

"MEK-ST" (trade name) manufactured by Nissan Chemical Industries Ltd. was used.

This was a dispersed solution of colloidal silica having average primary particle diameter of 0.015 μm in methyl ethyl ketone as a dispersion medium, and the solid content of the colloidal silica was 30%.

③ Preparation of second layer coating solution

| | |
|---|---|
| The above-described magnetic substance-containing intermediate solution | 19053 g |
| Diacetyl cellulose solution (solid content 4.5%, solvent: methyl ethylketone/cyclohexanone = 1/1) | 264 g |
| Colloidal silica dispersion solution [MEK-ST] [dispersion solution b] (solid content 30%) | 128 g |
| AA-1.5 dispersed solution [dispersion solution a] | 12 g |
| Millionate MR-400 (manufactured by Nippon Polyurethane Co., Ltd.) diluted solution (solid content 20%, diluting solvent: methyl ethylketone/cyclohexanone = 1/1) | 203 g |
| Methyl ethyl ketone | 170 g |
| Cyclohexanone | 170 g |

The coating solution which was obtained by mixing and stirring the above, was coated in a coating amount of 29.3 cc/m$^2$ by means of a wire bar. Drying of the coated layer was performed at 110° C. The thickness of the dried magnetic layer was 1.0 μm.

3) Third Layer (higher fatty acid ester lubricant-containing layer)

① Preparation of lubricant-undiluted dispersion solution

Solution A having the following formulation was dissolved by heating at 100° C., it was added to the following solution B, and the resultant mixture was dispersed by means of a high-pressure homogenizer, to obtain a lubricant-undiluted dispersion solution. solution A

| | |
|---|---|
| The compound shown below $C_6H_{13}CH(OH)(CH_2)_{10}COOC_{50}H_{101}$ | 399 weight parts |
| The compound shown below n-$C_{50}H_{101}O(CH_2CH_2O)_{16}H$ | 171 weight parts |
| Cyclohexanone | 830 weight parts |

-continued

| | |
|---|---|
| solution B | |
| Cyclohexanone | 8600 weight parts |

② Preparation of spherical inorganic particle dispersion solution

Spherical inorganic particle dispersion solution [c] was prepared according to the following formulation.

| | |
|---|---|
| Isopropyl alcohol | 93.54 weight parts |
| Silane coupling agent KBM 903 (trade name, manufactured by Shinetsu silicone Co.) Compound 1-1 | 5.53 weight parts |
| Seahostar KEP 50 (amorphous spherical silica; average particle diameter: 0.5 μm; trade name, manufactured by Nippon Shokubai Co., Ltd) | 88.00 weight parts |

The mixture having the above formulation was mixed for 10 minutes, and further the following was added.

| | |
|---|---|
| Diacetone alcohol | 252.93 weight parts |

A mixture solution of the above was dispersed while stirring for 3 hour on an ice bath by means of the ultrasonic wave homogenizer "SONIFIER 450 (trade name, manufactured by BRANSON Co., Ltd.)", to obtain spherical inorganic particles dispersed solution c.

③ Preparation of third layer coating solution

Solvents shown below were added to 542 g of the above-described lubricant-undiluted dispersion solution, to obtain a third layer coating solution.

| | |
|---|---|
| Diacetone alcohol | 5950 g |
| Cyclohexanone | 176 g |
| Ethyl acetate | 1700 g |
| The above shown Seahostar KEP 50 dispersion solution [c] | 124 g |
| FC 431 (trade name, manufactured by Sumitomo 3M Co., Ltd.; solid content 50%; solvent, ethyl acetate) | 2.65 g |
| BYK 310 (trade name, manufactured by BYK Chemi Japan Co., Ltd.; solid content 25%) | 5.3 g |

The above-described third layer coating solution was coated on the second layer in a coating amount of 10.35 cc/m$^2$, followed by drying at 110° C., and further dried at 97° C. for 3 minutes.

Thus, Sample 1 was prepared.

Evaluation of Coated Articles (prepared samples)

[1] Measurement of the degree of haze (transparency)

In order to evaluate the dispersion stability of spherical inorganic particles in a coating solution containing a sliding agent (a coating solution for the third layer), the degree of haze of the samples in which a subbing layer, and first to third layers have been coated on a support, was measured.

In the measurement, a hazemeter "VGS-1001 DP" (trade name, manufactured by Nippon Denshoku Co., Ltd.) was used. At this time, the measurement was carried out such that the direction of light incidence was from the side of the transparent magnetic recording layer. Based on the degree of haze, samples were classified into the following four grade:

| Samples Degree of haze | Grade |
|---|---|
| Less than 7.5% | ⊚ |
| 7.5% or more, but less than 8% | ○○ |
| 8% or more, but less than 8.5% | ○ |
| 8.5% or more | X |

Herein, the degree of haze is defined by the following equation:

| | |
|---|---|
| T = D + PT | PT: Parallel transmittance |
| H = (D/T) × 100(%) | T: Total (overall) transmittance |
| | D: Diffusion |
| | H: Degree of haze (turbidity) |

Further, based on the difference in the degree of haze between a sample in which a third layer-coating solution was coated instantly after the preparation thereof, and a sample in which a third layer-coating solution was coated in the same manner as the former sample, except that the third layer-coating solution was stood for two weeks at a room temperature after the preparation thereof, samples were classified into the following four grades:

| Samples Degree of haze | Grade |
|---|---|
| Less than 0.2% | ⊚ |
| 0.2% or more, but less than 0.4% | ○ |
| 0.4% or more, but less than 0.6% | ○Δ |
| 0.6% or more | X |

[2] Evaluation of magnetic input/output capacity

The thus-prepared sample was slitted to 24 mm-width films, and the resultant films were encased in cartridges, to obtain 40 shot films for an APS camera. The thus-obtained films were exposed to light by an APS camera "EPION 300 (trade name)," manufactured by FUJI PHOTO OPTICAL Co., Ltd., and photographing conditions at that time were recorded by magnetic force in a magnetic recording layer. After that, the exposed films were subjected to development processing using N4 solution of electric conductivity 1650 $\mu$Scm$^{-1}$, according to the CN-16X Chemical formulation, manufactured by Fuji Photo Film Co. Ltd. A processing machine for motion picture film, FNCP-900, trade name, manufactured by Fuji Photo Film Co., Ltd., was used. These processing conditions are those at which the density of a processing solution is higher than usual, and thereby the adhesion amount of the processing solution to the surface of a film is increased. The processed samples were rolled in cartridges using an attacher "AT-100 (trade name)," manufactured by Fuji Photo Film Co., Ltd. Subsequently, 50 rolls of the films were successively read at an ordinary temperature and 40% RH using a negacarrier "NC 240S (trade name)," manufactured by Fuji Photo Film Co., Ltd., to evaluate magnetic capacity. The above-described conditions for evaluation were used, because stain (deposit) comprising, as a primary element, a dried-up solid substance of a processing solution in development remaining on the surface of a transparent magnetic recording layer, is transferred and then accumulates onto a magnetic head surface during running of the samples, and consequently the output of a magnetic signal is lowered by a spacing loss, whereby a magnetic reading error is caused. The situation wherein the reduction of reproduction output is 30% based on the ideal reproduction output (the situation wherein the magnetic head is free from stain) is defined as the output reduction (magnetic error).

Output reduction did not occur up to 100 rolls :⊚

Output reduction occurred at more than 40 rolls, but 50 rolls or less :○

Output reduction occurred at more than 30 rolls, but 40 rolls or less :○Δ

Output reduction occurred at more than 20 rolls, but 30 rolls or less :Δ

Output reduction occurred at more than 10 rolls, but 20 rolls or less :X

Output reduction occurred at not more than 10 rolls :XX

Further, stain of the head after 50 rolls running was observed by a fiberscope.

Completely nothing :⊚

Almost nothing :○

Slightly present :○Δ

Present :Δ

Much :X

Very much :XX

The stain was found to be as illustrated above.

[3] Evaluation of Sliding Property (slipping property)

The thus-prepared samples were humidified at the temperature of 25° C. and the humidity of 60% RH for 2 hours, and thereafter a coefficient of kinematic friction thereof was measured by means of HEIDON-14 (trade name) coefficient of kinematic friction measuring instrument, under conditions of the load of 100 g using stainless steel balls, each having a diameter of 5 mm, and the friction rate of 60 cm/min. The smaller value the better sliding property is.

TABLE 1

| | Spherical inorganic particles | | Surface treatment of spherical inorganic particles | | | | Spherical organic high molecular particles | |
|---|---|---|---|---|---|---|---|---|
| Sample | Material | Average particle diameter | Amine-series silane coupling agent | | Surface active agent | | | Average particle diameter |
| | | | Kind | | | Kind | Material | |
| 1 | Silica | 0.5 $\mu$m | Compound 1-1 | (Primary amine) | None | | — | — |
| 2 | Silica | 0.5 $\mu$m | None | | None | | — | — |
| 3 | Silica | 0.5 $\mu$m | Compound 1-2 | (Primary amine) | None | | — | — |
| 4 | Silica | 0.5 $\mu$m | Compound 1-13 | (Secondary amine) | None | | — | — |

TABLE 1-continued

| Sample | | | | | | | | |
|---|---|---|---|---|---|---|---|---|
| 5 | Silica | 0.5 μm | Compound 1-14 | (Secondary amine) | None | | — | — |
| 6 | Silica | 0.5 μm | Compound 1-19 | (Tertiary amine) | None | | — | — |
| 7 | Silica | 0.5 μm | Compound as described in the text | | None | | — | — |
| 8 | Silica | 0.5 μm | Compound as described in the text | | None | | — | — |
| 9 | Silica | 0.5 μm | Compound as described in the text | | None | | — | — |
| 10 | Silica | 0.5 μm | Compound as described in the text | | None | | — | — |
| 11 | Silica | 0.5 μm | Compound as described in the text | | None | | — | — |
| 12 | Silica | 0.7 μm | Compound 1-1 | (Primary amine) | None | | — | — |
| 13 | Silica | 0.9 μm | Compound 1-1 | (Primary amine) | None | | — | — |
| 14 | None | | Compound 1-1 | (Primary amine) | None | | — | — |
| 15 | None | | None | | None | | — | — |
| 16 | Silica | 0.5 μm | Compound 1-1 | (Primary amine) | Compound 2-1 | (Anion) | — | — |
| 17 | Silica | 0.5 μm | Compound 1-2 | (Primary amine) | Compound 2-1 | (Anion) | — | — |
| 18 | Silica | 0.5 μm | Compound 1-13 | (Secondary amine) | Compound 2-1 | (Anion) | — | — |
| 19 | Silica | 0.5 μm | Compound 1-19 | (Tertiary amine) | Compound 2-1 | (Anion) | — | — |
| 20 | Silica | 0.5 μm | Compound 1-1 | (Primary amine) | Compound 2-2 | (Anion) | — | — |
| 21 | Silica | 0.5 μm | Compound 1-1 | (Primary amine) | Compound 2-5 | (Anion) | — | — |
| 22 | Silica | 0.5 μm | Compound 1-1 | (Primary amine) | Compound as described in the text | (Cation) | — | — |
| 23 | Silica | 0.5 μm | Compound 1-1 | (Primary amine) | Compound as described in the text | (Cation) | — | — |
| 24 | Silica | 0.5 μm | Compound 1-1 | (Primary amine) | Compound as described in the text | (Nonion) | — | — |
| 25 | Silica | 0.5 μm | Compound 1-1 | (Primary amine) | Compound as described in the text | (Nonion) | — | — |
| 26 | Silica | 0.5 μm | Compound 1-1 | (Primary amine) | Compound as described in the text | (Betaine) | — | — |
| 27 | Silica | 0.5 μm | Compound 1-1 | (Primary amine) | Compound as described in the text | (Betaine) | — | — |

| Sample | Magnetic input/output capability after development | | Transparency | | Sliding property | Remarks |
|---|---|---|---|---|---|---|
| | Magnetic output reduction | Degree of stain of the head | Degree of haze | Difference (Δ) in degree of haze | Coefficient of kinematic friction | |
| 1 | ○ | ○ | ○○○ | ○ | 0.09 | This invention |
| 2 | — | — | X | X | — | Comparative example |
| 3 | ○ | ○ | ○○○ | ○ | — | This invention |
| 4 | ○ | ○ | ○○ | ○ | — | This invention |
| 5 | ○ | ○ | ○○ | ○ | — | This invention |
| 6 | ○Δ | ○Δ | ○ | ○Δ | — | This invention |
| 7 | — | — | X | X | — | Comparative example |
| 8 | — | — | X | X | — | Comparative example |
| 9 | — | — | X | X | — | Comparative example |
| 10 | — | — | X | X | — | Comparative example |
| 11 | — | — | X | X | — | Comparative example |
| 12 | ○ | ○ | ○○○ | ○ | — | This invention |
| 13 | ○ | ○ | ○○○ | ○ | — | This invention |
| 14 | X X | X X | ○○○ | ⊙ | — | Comparative example |
| 15 | X X | X X | ○○○ | ⊙ | — | Comparative example |
| 16 | ○ | ○ | ○○○ | ⊙ | 0.09 | This invention |
| 17 | ○ | ○ | ○○○ | ⊙ | — | This invention |
| 18 | ○ | ○ | ○○○ | ⊙ | — | This invention |
| 19 | ○ | ○Δ | ○○ | ○ | — | This invention |
| 20 | ○ | ○ | ○○○ | ⊙ | — | This invention |
| 21 | ○ | ○ | ○○○ | ⊙ | — | This invention |
| 22 | ○ | ○ | ○○○ | ○ | — | This invention |
| 23 | ○ | ○ | ○○○ | ○ | — | This invention |
| 24 | ○ | ○ | ○○○ | ○ | — | This invention |
| 25 | ○ | ○ | ○○○ | ○ | — | This invention |
| 26 | ○ | ○ | ○○○ | ○ | — | This invention |
| 27 | ○ | ○ | ○○○ | ○ | — | This invention |

As is apparent from Table 1, the compatibility of secure magnetic input/output capability and transparency (a good dispersibility of the spherical inorganic particles) in the samples of the present invention is so outstanding that the present invention can provide an excellent transparent magnetic recording medium.

Sample 2

Sample 2 was prepared in the same manner as in Sample 1, except that the compound 1-1, which was used in the preparation of the spherical inorganic particle dispersed solution, was not used.

Sample 3

Sample 3 was prepared in the same manner as in Sample 1, except that the compound 1-1, which was used in the preparation of the spherical inorganic particles dispersed solution, was changed to the compound 1-2.

Sample 4

Sample 4 was prepared in the same manner as in Sample 1, except that the compound 1-1, which was used in the preparation of the spherical inorganic particles dispersed solution, was changed to the compound 1-13.

Sample 5

Sample 5 was prepared in the same manner as in Sample 1, except that the compound 1-1, which was used in the preparation of the spherical inorganic particles dispersed solution, was changed to the compound 1-14.

Sample 6

Sample 6 was prepared in the same manner as in Sample 1, except that the compound 1-1, which was used in the preparation of the spherical inorganic particles dispersed solution, was changed to the compound 1-19.

Sample 7

Sample 7 was prepared in the same manner as in Sample 1, except that the compound 1-1, which was used in the preparation of the spherical inorganic particles dispersed solution, was changed to the X-12-641 (trade name, manufactured by Shinetsu silicone Co.; 3-(polyoxyethynyl) oxypropyl trimethoxysilane).

Sample 8

Sample 8 was prepared in the same manner as in Sample 1, except that the compound 1-1, which was used in the preparation of the spherical inorganic particles dispersed solution, was changed to the KBM-403 (trade name, manufactured by Shinetsu silicone Co.; γ-glycidoxypropyl trimethoxysilane).

Sample 9

Sample 9 was prepared in the same manner as in Sample 1, except that the compound 1-1, which was used in the preparation of the spherical inorganic particles dispersed solution, was changed to the Y-5187 (trade name, manufactured by Nippon Unicar Co., Ltd.; γ-isocyanatepropyl trimethoxysilane).

Sample 10

Sample 10 was prepared in the same manner as in Sample 1, except that the compound 1-1, which was used in the preparation of the spherical inorganic particles dispersed solution, was changed to the KBM-1003 (trade name, manufactured by Shinetsu silicone Co.; vinyl trimethoxysilane).

Sample 11

Sample 11 was prepared in the same manner as in Sample 1, except that the compound 1-1, which was used in the preparation of the spherical inorganic particles dispersed solution, was changed to the KBM-803 (trade name, manufactured by Shinetsu silicone Co.; γ-mercaptopropyl trimethoxysilane).

Sample 12

Sample 12 was prepared in the same manner as in Sample 1, except that the Seahostar KEP 50, which was used in the preparation of the spherical inorganic particles dispersed solution, was changed to the Seahostar KEP 70 (trade name, amorphous silica, average particle diameter is 0.7 μm, manufactured by Nippon Shokubai Co., Ltd).

Sample 13

Sample 13 was prepared in the same manner as in Sample 1, except that the Seahostar KEP 50, which was used in the preparation of the spherical inorganic particles dispersed solution, was changed to the Seahostar KEP 90 (trade name, amorphous silica, average particle diameter is 0.9 μm, manufactured by Nippon Shokubai Co., Ltd).

Sample 14

Sample 14 was prepared in the same manner as in Sample 1, except that the Seahostar KEP 50, which was used in the preparation of the spherical inorganic particles dispersed solution, was excluded.

Sample 15

Sample 15 was prepared in the same manner as in Sample 1, except that the compound 1-1 and Seahostar KEP 50, both of which were used in the preparation of the spherical inorganic particle dispersion solution, were excluded.

Sample 16

Sample 16 was prepared in the same manner as in Sample 1, except that the silica dispersion solution, which was used in the preparation of the spherical inorganic particles dispersed solution, was changed to the following mixed and stirred (20 min) dispersion solution.

| | |
|---|---|
| Silica dispersion solution of sample 1 | 300 weight parts |
| Compound 2-1 | 2 weight parts |

Sample 17

Sample 17 was prepared in the same manner as in Sample 3, except that the silica dispersion solution, which was used in the preparation of the spherical inorganic particles dispersed solution, was changed to the following mixed and stirred (20 min) dispersion solution.

| | |
|---|---|
| Silica dispersion solution of Sample 3 | 300 weight parts |
| Compound 2-1 | 2 weight parts |

Sample 18

Sample 18 was prepared in the same manner as in Sample 4, except that the silica dispersion solution, which was used in the preparation of the spherical inorganic particles dispersed solution, was changed to the following mixed and stirred (20 min) dispersion solution.

| | |
|---|---|
| Silica dispersion solution of Sample 4 | 300 weight parts |
| Compound 2-1 | 2 weight parts |

Sample 19

Sample 19 was prepared in the same manner as in Sample 6, except that the silica dispersion solution, which was used in the preparation of the spherical inorganic particles dispersed solution, was changed to the following mixed and stirred (20 min) dispersion solution.

| | |
|---|---|
| Silica dispersion solution of Sample 6 | 300 weight parts |
| Compound 2-1 | 2 weight parts |

Sample 20

Sample 20 was prepared in the same manner as in Sample 16, except that the compound 2-1, which was used in the preparation of the spherical inorganic particles dispersed solution, was changed the compound 2-2.

Sample 21

Sample 21 was prepared in the same manner as in Sample 16, except that the compound 2-1, which was used in the preparation of the spherical inorganic particles dispersed solution, was changed the compound 2-5.

Sample 22

Sample 22 was prepared in the same manner as in Sample 16, except that the compound 2-1, which was used in the preparation of the spherical inorganic particles dispersed solution, was changed the following compound (cation-series surface-active agent).

Compound:

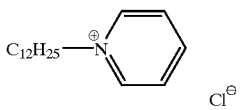

Sample 23

Sample 23 was prepared in the same manner as in Sample 16, except that the compound 2-1, which was used in the preparation of the spherical inorganic particles dispersed solution, was changed the following compound (cation-series surface-active agent).

Compound:

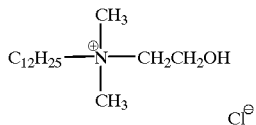

Sample 24

Sample 24 was prepared in the same manner as in Sample 16, except that the compound 2-1, which was used in the preparation of the spherical inorganic particles dispersed solution, was changed the following compound (nonion-series surface-active agent).

Compound:

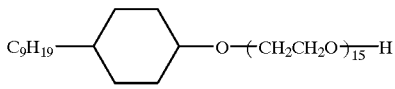

Sample 25

Sample 25 was prepared in the same manner as in Sample 16, except that the compound 2-1, which was used in the preparation of the spherical inorganic particles dispersed solution, was changed the following compound (nonion-series surface-active agent).

Compound:

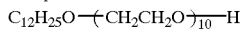

Sample 26

Sample 26 was prepared in the same manner as in Sample 16, except that the compound 2-1, which was used in the preparation of the spherical inorganic particles dispersed solution, was changed the following compound (betaine-series surface-active agent).

Compound:

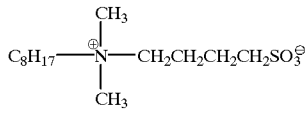

Sample 27

Sample 27 was prepared in the same manner as in Sample 16, except that the compound 2-1, which was used in the preparation of the spherical inorganic particles dispersed solution, was changed the following compound (betaine-series surface-active agent).

Compound:

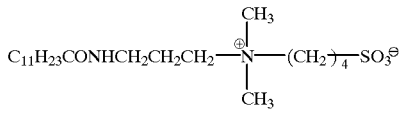

As is apparent from Table 1, the compatibility of secure magnetic input/output capability and transparency (a good dispersibility of the spherical inorganic particles) in the samples of the present invention, is outstanding, and the following effects can be found:

① A sufficient magnetic input/output capability cannot be secured under the condition of a very thick developing solution if spherical inorganic particles (silica in Table 1) are absent.

② The dispersion stability of spherical inorganic particles in a coating solution containing a sliding agent, can be improved by the use of a primary to tertiary amine-series silane coupling agent. Preferably a primary to secondary, and more preferably a primary, amine-series silane coupling agent, can be used.

③ The dispersion stability can be further improved by the use of an anionic surface active agent in addition to the above-described silane coupling agent.

Sample 28

Sample 28 was prepared in the same manner as in Sample 16, except that the all of diacetone alcohol-content in the third layer coating solution was changed to cyclohexanone.

Sample 29

Sample 29 was prepared in the same manner as in Sample 16, except that the all of diacetone alcohol-content in the third layer coating solution was changed to methyl ethyl ketone.

Sample 30

Sample 30 was prepared in the same manner as in Sample 16, except that the all of diacetone alcohol-content in the third layer coating solution was changed to acetone.

Sample 31

Sample 31 was prepared in the same manner as in Sample 16, except that the all of diacetone alcohol-content in the third layer coating solution was changed to xylene.

Sample 32

Sample 32 was prepared in the same manner as in Sample 16, except that the all of diacetone alcohol-content in the third layer coating solution was changed to methyl acetate.

Sample 33

Sample 33 was prepared in the same manner as in Sample 16, except that the all of diacetone alcohol-content in the third layer coating solution was changed to isopropyl alcohol.

Sample 34

Sample 34 was prepared in the same manner as in Sample 16, except that the all of diacetone alcohol-content in the third layer coating solution was changed to 1-acetoxy-2-methoxyethane.

Sample 35

Sample 35 was prepared in the same manner as in Sample 16, except that the all of diacetone alcohol-content in the third layer coating solution was changed to ethylene glycol diacetate.

Sample 36

Sample 36 was prepared in the same manner as in Sample 16, except that the all of diacetone alcohol-content in the third layer coating solution was changed to methyl acetoacetate.

Sample 37

Sample 37 was prepared in the same manner as in Sample 16, except that the all of diacetone alcohol-content in the third layer coating solution was changed to ethyl acetoacetate.

Both the magnetic input/output characteristics and the transparency of the thus-prepared samples 16 and 28 to 37 were all satisfactory. On the other hand, the results of sliding property evaluated with respect to these samples were 0.09 (sample 16), 0.20 (sample 28), 0.15 (sample 29), 0.14 (sample 30), 0.14 (sample 31), 0.15 (sample 32), 0.13 (sample 33), 0.10 (sample 34), 0.10 (sample 35), 0.10 (sample 36), and 0.10 (sample 37), in terms of the coefficient of kinematic friction. A transparent magnetic recording medium in which at least one of diacetone alcohol, 1-acetoxy-2-methoxy ethane, ethyleneglycoldiacetate, methyl acetoacetate, and ethyl acetoacetate is incorporated as a coating solvent for a third layer-coating solution, exerts more excellent sliding capability, and thereby a more satisfactory medium running (traveling) property can be obtained. As a result, a more desired transparent magnetic recording medium can be obtained.

Sample 38

A sample was prepared in the same manner as in sample 16, except that the colloidal silica dispersion solution "MEK-ST" to be added to a second layer-coating solution was omitted, and in place thereof, the same amount of methylethyl ketone was supplementally added thereto. This sample is designated as Sample 38.

Sample 39

A sample was prepared in the same manner as in sample 16, except that the colloidal silica dispersion solution "MEK-ST" to be added to a second layer-coating solution was reduced to the amount of ⅕, and instead thereof, methylethyl ketone was supplementally added thereto in the amount corresponding to the above-mentioned reduction. This sample is designated as Sample 39.

Sample 40

A sample was prepared in the same manner as in sample 16, except that the colloidal silica dispersion solution "MEK-ST" to be added to a second layer-coating solution was increased by twice, and methylethyl ketone in the second layer-coating solution, was reduced in the rate of an amount equal to the increased amount. This sample is designated as Sample 40.

TABLE 2

| Sample | Spherical inorganic particles | | | Surface treatment of spherical inorganic particles | | | | Spherical organic high molecular particles | |
|---|---|---|---|---|---|---|---|---|---|
| | Material | Average particle diamter | Amount of colloidal silica | Amine-series silane coupling agent | | Surface active agent | | Material | Average particle diameter |
| 38 | Silica | 0.5 μm | None | Compound 1-1 | (Primary amine) | Compound 2-1 | (Anion) | — | — |
| 39 | Silica | 0.5 μm | 10 mg/m² | Compound 1-1 | (Primary amine) | Compound 2-1 | (Anion) | — | — |
| 40 | Silica | 0.5 μm | 100 mg/m² | Compound 1-1 | (Primary amine) | Compound 2-1 | (Anion) | — | — |
| 41 | Silica | 0.5 μm | 200 mg/m² | Compound 1-1 | (Primary amine) | Compound 2-1 | (Anion) | — | — |
| 42 | Silica | 0.5 μm | 300 mg/m² | Compound 1-1 | (Primary amine) | Compound 2-1 | (Anion) | — | — |
| 43 | Silica | 0.5 μm | 50 mg/m² | Compound 1-1 | (Primary amine) | Compound 2-1 | (Anion) | Polysiloxane | 0.5 μm |
| 44 | Silica | 0.5 μm | 50 mg/m² | Compound 1-1 | (Primary amine) | Compound 2-1 | (Anion) | Polysiloxane | 0.9 μm |
| 45 | Silica | 0.5 μm | 50 mg/m² | Compound 1-1 | (Primary amine) | Compound 2-1 | (Anion) | PMMA | 1.0 μm |
| 16 | Silica | 0.5 μm | 50 mg/m² | Compound 1-1 | (Primary amine) | Compound 2-1 | (Anion) | — | — |

| Sample | Magnetic input/output capability after development | | Transparency | | Sliding property | Compulsory rubbing surface of magnetic recording layer and surface of photographic emulsion layer | Remarks |
|---|---|---|---|---|---|---|---|
| | Magnetic output reduction | Degree of stain of the head | Degree of haze | Difference in degree of haze | Coefficient of kinematic friction | | |
| 38 | ○Δ | ○Δ | ○○○ | ⊙ | 0.09 | — | This invention |
| 39 | ○ | ○ | ○○○ | ⊙ | 0.09 | — | This invention |
| 40 | ○ | ○ | ○○○ | ⊙ | 0.10 | — | This invention |
| 41 | ○ | ○ | ○○○ | ⊙ | 0.10 | — | This invention |
| 42 | ○ | ○ | ○○○ | ⊙ | 0.15 | — | This invention |
| 43 | ○ | ○ | ○○○ | ⊙ | — | ○ | This invention |
| 44 | ⊙ | ⊙ | ○○○ | ⊙ | — | ⊙ | This invention |
| 45 | ⊙ | ⊙ | ○○○ | ⊙ | — | ⊙ | This invention |
| 16 | ○ | ○ | ○○○ | ⊙ | — | ○Δ | This invention |

Sample 41

A sample was prepared in the same manner as in sample 16, except that the colloidal silica dispersion solution "MEK-ST" to be added to a second layer-coating solution 4 times, and the same amount of methylethyl ketone in the second layer-coating solution, was reduced in the rate of an amount equal to the increased amount. This sample is designated as Sample 41.

Sample 42

A sample was prepared in the same manner as in sample 16, except that an amount of the colloidal silica dispersion solution "MEK-ST" to be added to a second layer-coating solution was increased by 6 times, and methylethyl ketone in the second layer-coating solution, was reduced in the rate of an amount equal to the increased amount. This sample is designated as Sample 42.

The thus-prepared samples 38 to 42 each exhibited an excellent transparency, but as is apparent from Table 2, even though the magnetic input/output capability of the sample 38 was within the range of an acceptable grade, its grade was lower by one rank than others. This is because colloidal silica in the second layer is omitted. On the other hand, samples 39 to 42 each exhibited an excellent magnetic input/output capability, but upon the evaluation of the sliding property, the coefficient of kinematic friction of samples 39 to 42 was in this order, 0.09 (sample 39), 0.09 (sample 40), 0.10 (sample 41), 0.15 (sample 42), while that of sample 16 was 0.09. Further, it is further more preferred that a coating amount of the colloidal silica in the second layer is about 200 mg/m² or less on account that an excellent sliding property can be obtained. An amount of the colloidal silica in which an excellent magnetic input/output capability, transparency and sliding property is attained, is in the range of from 10 mg/m² to 200 mg/m².

Sample 43

A sample was prepared in the same manner as in sample 16, except that a dispersion solution of spherical inorganic particles (Seahostar KEP 50) to be added to a third layer-coating solution, was reduced to the amount of 12/28, and instead thereof, a dispersion solution of the spherical organic high molecular particles as described below, was supplementally added thereto in the amount corresponding to the above-mentioned reduction. This sample is designated as Sample 43.

| | |
|---|---|
| Tosupearl 105 (trade name, manufactured by Toshiba Silicone Co., Ltd., Spherical crosslinking polysiloxane particles Average grain size 0.5 μm) | 60 g |
| Methylethyl ketone | 120 g |
| Cyclohexanone | 120 g |

(Solid content 20%, Solvent: methylethyl ketone/cyclohexanone=1/1)

These materials were dispersed for 2 hours while stirring and cooling on an ice, by means of an ultrasonic homogenizer "SONIFIER 450 (trade name, manufactured by BRANSON Co., Ltd.)", to prepare a dispersion solution.

TABLE 3

| Sample | Spherical inorganic particles Material | Average particle diameter | α-alumina Trade name | Average grain size | Average height of the protrusion | Surface treatment of spherical inorganic particles Amine-series silane coupling agent | | Surface active agent | |
|---|---|---|---|---|---|---|---|---|---|
| 44 | Silica | 0.5 μm | AA-1.5 | 1.5 μm | 0.5 μm | Compound 1-1 | (Primary amine) | Compound 2-1 | (Anion) |
| 46 | Silica | 0.5 μm | AA-1 | 1.2 μm | 0.2 μm | Compound 1-1 | (Primary amine) | Compound 2-1 | (Anion) |
| 47 | Silica | 0.5 μm | AA-0.7 | 0.9 μm | 0 μm | Compound 1-1 | (Primary amine) | Compound 2-1 | (Anion) |

| Sample | Spherical organic high molecular particles Material | Average particle diameter | Magnetic input/output capability after development Magnetic output reduction | Degree of stain of the head | Transparency Degree of haze | Difference in degree of haze | Average height of the protrusion of spherical inorganic particle | Average height of the protrusion of spherical organic high molecular particle | Ability to abrade magnetic head | Remarks |
|---|---|---|---|---|---|---|---|---|---|---|
| 44 | Polysiloxane | 0.9 μm | ⊚ | ⊚ | ooo | ⊚ | 0.2 μm | 0.4 μm | ⊚ | This invention |
| 46 | Polysiloxane | 0.9 μm | ⊚ | ⊚ | ooo | ⊚ | 0.2 μm | 0.4 μm | o | This invention |
| 47 | Polysiloxane | 0.9 μm | ⊚ | ⊚ | ooo | ⊚ | 0.2 μm | 0.4 μm | Δ | This invention |

Sample 44

A sample was prepared in the same manner as in sample 16, except that a dispersion solution of spherical inorganic particles (Seahostar KEP 50) to be added to a third layer-coating solution, was reduced to the amount of 12/28, and instead thereof, a dispersion solution of the spherical organic high molecular particles as described below, was supplementally added thereto in the amount corresponding to the above-mentioned reduction. This sample is designated as Sample 44.

| | |
|---|---|
| XC99-A8808 (trade name, manufactured by Toshiba Silicone Co., Ltd., Spherical crosslinking polysiloxane particles Average grain size 0.9 μm) | 60 g |
| Methylethyl ketone | 120 g |
| Cyclohexanone | 120 g |

(Solid content 20%, Solvent: methylethyl ketone/cyclohexanone=1/1)

These materials were dispersed for 2 hours while stirring and cooling on an ice, by means of an ultrasonic homogenizer "SONIFIER 450 (trade name, manufactured by BRANSON Co., Ltd.)", to prepare a dispersion solution.

Sample 45

A sample was prepared in the same manner as in sample 16, except that a dispersion solution of spherical inorganic particles (Seahostar KEP 50) to be added to a third layer-coating solution, was reduced to the amount of $^{12}/_{28}$, and instead thereof, a dispersion solution of the spherical organic high molecular particles as described below, was supplementally added thereto in the amount corresponding to the above-mentioned reduction. This sample is designated as Sample 45.

| | |
|---|---|
| MX-100α (trade name, manufactured by Soken Chemical & Engineering Co., Ltd., Spherical crosslinking PMMA particles Average grain size 1.0 μm) | 60 g |
| Methylethyl ketone | 120 g |
| Cyclohexanone | 120 g |

(Solid content 20%, Solvent: methylethyl ketone/cyclohexanone=1/1)

These materials were dispersed for 2 hours while stirring and cooling on an ice, by means of an ultrasonic homogenizer "SONIFIER 450 (manufactured by BRANSON Co., Ltd.)", to prepare a dispersion solution.

The following evaluation was carried out with respect to samples 16, 43, 44, and 45. This evaluation is to check whether the surface of the silver halide photographic emulsion layer is scratched or not, when the surface of a transparent magnetic recording layer side and the surface of a silver halide emulsion layer side, are rubbed with each other (this situation is supposed at the time when a light-sensitive material is taken out or in, from a cartridge) in the case where the magnetic recording medium is used as a silver halide photographic light-sensitive material. At this time, considerably compulsory conditions were applied to the evaluation test in order to increase a sensitivity.

Evaluation Method and Conditions

① The same kinematic friction meter as used to measure the above-mentioned coefficient of kinematic friction, is used.
② The steel bolls are omitted from the kinematic friction meter and instead thereof, the kinematic friction meter is equipped with a flat SUS plate of 1 cm square.
③ The silver halide photographic light-sensitive material is adhered to the SUS plate so that the surface of a light-sensitive silver halide emulsion layer is oriented toward the outside, and the said surface of the emulsion layer and the surface of another transparent magnetic recording layer which is laid upon the back surface of the plate, are rubbed with each other, while being weighted by 500 g at the traveling rate of 100 mm/sec. And this rubbing is carried out 10 times of a reciprocating motion.
④ The degree of scratch on the surface of the emulsion layer was classified into the following five grades, in terms of both the visual observation and whether the scratch comes out on a print, or not.

| | Grade |
|---|---|
| No scratch is found by the visual observation and no scratch comes out on a print. | ⊚ |
| Almost no scratch is found by the visual observation and no scratch | ○ |
| comes out on a print. | |
| Some scratch is found by the visual observation but no scratch comes out on a print. | ○△ |
| Scratches are apparently found by the observation, but no scratch comes out on a print. | △ |
| Scratches are apparently found by the visual observation and they come out on a print. | X |

As is apparent from Table 2, each of samples 16, 43 to 45 secures excellent magnetic input/output capability and transparency. Further, a problem of scratching on the surface of a light-sensitive silver halide emulsion layer, is further reduced by using an amount of spherical organic high molecular particles in combination with spherical inorganic particles. Moreover, the problem of scratching is further reduced by using the spherical organic high molecular particles having a larger average primary grain size than that of the spherical inorganic particles, so that a silver halide photographic light-sensitive material having an extremely excellent transparent magnetic recording layer can be provided, wherein the magnetic input/output capability of the transparent magnetic recording layer has been further improved.

Sample 46

A sample was prepared in the same manner as in sample 44, except that in a dispersion solution of AA-1.5, which is an α-alumina, to be added to a second layer-coating solution, the AA-1.5 (average primary grain size 1.5 μm) was changed to AA-1 (average primary grain size 1.2 μm). This sample is designated as Sample 46.

Sample 47

A sample was prepared in the same manner as in sample 44, except that in a dispersion solution of AA-1.5, which is an α-alumina, to be added to a second layer-coating solution, the AA-1.5 (average primary grain size 1.5 μm) was changed to AA-0.7 (average primary grain size 0.9 μm). This sample is designated as Sample 47.

Samples 44, 46, and 47 were each evaluated as described below. This evaluation is to check whether the surface of a magnetic head can be restored to a mirror plane by an α-alumina, in the case where the surface of the magnetic head was scratched by an atmospheric dust, sand and the like being caught during a running of the medium.

Evaluation Method and Conditions

① A magnetic head is prepared, whose surface has been scratched to the depth of 1 μm in the vicinity of a magnetic head gap (by means of a Knoop indentor).
② 100 m of a slitted film is moved across the magnetic head.
③ The scratches on the surface of the magnetic head are checked whether the scratches are disappeared, or are made shallow.

| | |
|---|---|
| The scratches are completely disappeared: | ⊚ |
| The depth of the scratches is reduced to 0.5 μm or less: | ○ |

-continued

| | |
|---|---|
| The depth of the scratches is from 0.5 μm to 1.0 μm: | Δ |

As is apparent from Table 3, each of samples 44, 46, and 47 secures an excellent magnetic input/output capability and transparency. Further, by using an α-alumina having such an average grain size that the height of the protrusion is substantially higher than the average height of the protrusion of spherical inorganic particles and the average height of the protrusion of spherical organic high molecular particles, an extremely excellent transparent magnetic recording medium that is able to eliminate the scratches on the surface of the magnetic head, can be provided. Further, the reason why even the sample 46 exhibits a certain effect is presumed to be that α-alumina contacts the magnetic head become spherical particles go down a little to the inside of the layer, due to the load by counter rollers (a weight load applied to move a film across the magnetic head when the magnetic head travels.

Lastly, the contents of the silver halide photographic light-sensitive material and a color processing method, for use in the present invention, are described below.

Each of layers having the composition described below, which are and described in Japanese Patent Application No. 10-111196, were multi-coated to prepare a multi-layer color light-sensitive material sample. Color light-sensitive material Each of layers having the below-shown compositions were multi-cored on a support (base), which had been provided an undercoat, to prepare a multi-layer color light-sensitive material.

(Compositions of Light-sensitive Layers)

Main materials used in each layer were classified as follows:

ExC: Cyan coupler  UV:Ultraviolet ray absorbent

ExM: Magenta coupler  HBS: High-boiling organic solvent

ExY: Yellow coupler  H: Gelatin hardening agent

ExS: Sensitizing dye

Figures corresponding to each component represents the coating amount in terms of g/m², and for silver halide in terms of silver. However, with respect to sensitizing dyes, the coating amount per mol of silver halide in the same layer, is shown in terms of mol.

First Layer (First halation-preventing layer)

| | |
|---|---|
| Black colloidal silver | silver0.155 |
| Silver bromoiodide emulsion P | silver0.01 |
| Gelatin | 0.87 |
| ExC-1 | 0.002 |
| ExC-3 | 0.002 |
| Cpd-2 | 0.001 |
| HBS-1 | 0.004 |
| HBS-2 | 0.002 |

Second Layer (Second halation-preventing layer)

| | |
|---|---|
| Black colloidal silver | silver0.066 |
| Gelatin | 0.407 |
| ExM-1 | 0.050 |
| ExF-1 | 2.0 ×10⁻³ |
| HBS-1 | 0.074 |
| Solid disperse dye ExF-2 | 0.015 |
| Solid disperse dye ExF-3 | 0.020 |

Third Layer (Intermediate layer)

| | |
|---|---|
| Silver bromoiodide emulsion O | silver0.020 |
| ExC-2 | 0.022 |
| Polyethyl acrylate latex | 0.085 |
| Gelatin | 0.294 |

Fourth Layer (Low-sensitivity red-sensitive emulsion layer)

| | | |
|---|---|---|
| Silver bromoiodide emulsion A | silver0.323 | |
| ExS-1 | 5.5 | ×10⁻⁴ |
| ExS-2 | 1.0 | ×10⁻⁵ |
| ExS-3 | 2.4 | ×10⁻⁴ |
| ExC-1 | 0.109 | |
| ExC-3 | 0.044 | |
| ExC-4 | 0.072 | |
| ExC-5 | 0.011 | |
| ExC-6 | 0.003 | |
| Cpd-2 | 0.025 | |
| Cpd-4 | 0.025 | |
| HBS-1 | 0.17 | |
| Gelatin | 0.80 | |

Fifth Layer (Medium-sensitivity red-sensitive emulsion layer)

| | | |
|---|---|---|
| Silver bromoiodide emulsion B | silver0.28 | |
| Silver bromoiodide emulsion C | silver0.54 | |
| ExS-1 | 5.0 | ×10⁻⁴ |
| ExS-2 | 1.0 | ×10⁻⁵ |
| ExS-3 | 2.0 | ×10⁻⁴ |
| ExC-1 | 0.14 | |
| ExC-2 | 0.026 | |
| ExC-3 | 0.020 | |
| ExC-4 | 0.12 | |
| ExC-5 | 0.016 | |
| ExC-6 | 0.007 | |
| Cpd-2 | 0.036 | |
| Cpd-4 | 0.028 | |
| HBS-1 | 0.16 | |
| Gelatin | 1.18 | |

Sixth Layer (High-sensitivity red-sensitive emulsion layer)

| | |
|---|---|
| Silver bromoiodide emulsion D | silver 1.47 |
| ExS-1 | 3.7 × 10⁻⁴ |
| ExS-2 | 1 × 10⁻⁵ |
| ExS-3 | 1.8 × 10⁻⁴ |
| ExC-4 | 0.18 |
| ExC-3 | 0.07 |
| ExC-6 | 0.029 |
| ExC-7 | 0.010 |
| ExY-5 | 0.008 |
| Cpd-2 | 0.046 |
| Cpd-4 | 0.077 |
| HBS-1 | 0.25 |

Seventh Layer (Intermediate layer)

| | |
|---|---|
| HBS-2 | 0.12 |
| Gelatin | 2.12 |

| | |
|---|---|
| Cpd-1 | 0.089 |
| Solid disperse dye ExF-4 | 0.030 |
| HBS-1 | 0.050 |
| Polyethyl acrylate latex | 0.83 |
| Gelatin | 0.84 |

Eighth Layer (Layer to provide interlayer effect to red-sensitive layers)

| | | |
|---|---|---|
| Silver bromoiodide emulsion E | silver0.560 | |
| ExS-6 | 1.7 | $\times 10^{-4}$ |
| ExS-10 | 4.6 | $\times 10^{-4}$ |
| Cpd-4 | 0.030 | |
| ExM-2 | 0.096 | |
| ExM-3 | 0.028 | |
| ExY-1 | 0.031 | |
| HBS-1 | 0.085 | |
| HBS-3 | 0.003 | |
| Gelatin | 0.58 | |

Ninth Layer (Low-sensitivity green-sensitive emulsion

| | | |
|---|---|---|
| Silver bromoiodide emulsion F | silver0.39 | |
| Silver bromoiodide emulsion G | silver0.28 | |
| Silver bromoiodide emulsion H | silver0.35 | |
| ExS-4 | 2.4 | $\times 10^{-5}$ |
| ExS-5 | 1.0 | $\times 10^{-4}$ |
| ExS-6 | 3.9 | $\times 10^{-4}$ |
| ExS-7 | 7.7 | $\times 10^{-5}$ |
| ExS-8 | 3.3 | $\times 10^{-4}$ |
| ExM-2 | 0.36 | |
| ExM-3 | 0.045 | |
| HBS-1 | 0.28 | |
| HBS-3 | 0.01 | |
| HBS-4 | 0.27 | |
| Gelatin | 1.39 | |

Tenth layer (Middle-sensitivity green-sensitive emulsion layer)

| | | |
|---|---|---|
| Silver bromoiodide emulsion I | silver0.45 | |
| ExS-4 | 5.3 | $\times 10^{-5}$ |
| ExS-7 | 1.5 | $\times 10^{-4}$ |
| ExS-8 | 6.3 | $\times 10^{-4}$ |
| ExC-6 | 0.009 | |
| ExM-2 | 0.031 | |
| ExM-3 | 0.029 | |
| ExY-1 | 0.006 | |
| ExM-4 | 0.028 | |
| HBS-1 | 0.064 | |
| HBS-3 | 2.1 | $\times 10^{-3}$ |
| Gelatin | 0.44 | |

Eleventh layer (High-sensitivity green-sensitive emulsion layer)

| | | |
|---|---|---|
| Silver bromoiodide emulsion I | silver0.19 | |
| Silver bromoiodide emulsion J | silver0.80 | |
| ExS-4 | 4.1 | $\times 10^{-5}$ |
| ExS-7 | 1.1 | $\times 10^{-4}$ |
| ExS-8 | 4.9 | $\times 10^{-4}$ |
| ExC-6 | 0.004 | |
| ExM-1 | 0.016 | |
| ExM-3 | 0.036 | |
| ExM-4 | 0.020 | |
| ExM-5 | 0.004 | |
| ExY-5 | 0.003 | |
| ExM-2 | 0.013 | |
| Cpd-3 | 0.004 | |
| Cpd-4 | 0.007 | |
| HBS-1 | 0.18 | |
| Poly(ethyl acrylate)latex | 0.099 | |
| Gelatin | 1.11 | |

Twelfth layer (Yellow filter layer)

| | |
|---|---|
| Yellow colloidal silver | silver0.047 |
| Cpd-1 | 0.16 |
| Solid disperse dye EXF-5 | 0.020 |
| Solid disperse dye EXF-6 | 0.020 |
| Oil-soluble dye ExF-7 | 0.010 |
| HBS-1 | 0.082 |
| Gelatin | 1.057 |

Thirteenth Layer (Low-sensitivity blue-sensitive emulsion layer)

| | | |
|---|---|---|
| Silver bromoiodide emulsion K | silver0.18 | |
| Silver bromoiodide emulsion L | silver0.20 | |
| Silver bromoiodide emulsion M | silver0.07 | |
| ExS-9 | 4.4 | $\times 10^{-4}$ |
| ExS-10 | 4.0 | $\times 10^{-4}$ |
| ExC-1 | 0.041 | |
| ExC-8 | 0.012 | |
| ExY-1 | 0.035 | |
| ExY-2 | 0.71 | |
| ExY-3 | 0.10 | |
| ExY-4 | 0.005 | |
| Cpd-2 | 0.10 | |
| Cpd-3 | 4.0 | $\times 10^{-3}$ |
| HBS-1 | 0.24 | |
| Gelatin | 1.41 | |

Fourteenth Layer (High-sensitivity blue-sensitive emulsion layer)

| | | |
|---|---|---|
| Silver bromoiodide emulsion N | silver0.75 | |
| ExS-9 | 3.6 | $\times 10^{-4}$ |
| ExC-1 | 0.013 | |
| ExY-2 | 0.31 | |
| ExY-3 | 0.05 | |
| ExY-6 | 0.062 | |
| Cpd-2 | 0.075 | |
| Cpd-3 | 1.0 | $\times 10^{-3}$ |
| HBS-1 | 0.10 | |
| Gelatin | 0.91 | |

Fifteenth Layer (First protective layer)

| Silver bromoiodide emulsion O | silver 0.30 |
|---|---|
| UV-1 | 0.21 |
| UV-2 | 0.13 |
| UV-3 | 0.20 | below. A sample was cooled to $-115°$ C. in a vacuum of $1\times10$ torr or less, and was irradiated by mgkα as a probe Xray at the Xray source voltage of 8 kV and the Xray electric current of 20 mA, and $Ag_3$ $d_{5/2}$, $Br_3d$, and $I_3$ $d_{5/2}$ electrons were measured. The integrated intensity of the measured peak was corrected with a sensitivity factor, and based on these intensity ratio, the surface iodo content was obtained.

TABLE 4

| Light-sensitive silver halide emulsion | Average iodo content (mol %) | Coefficient of variation concerning iodo distribution among particles | Average particle size (diameter corresponding to sphere*1; μm) | Coefficient of variation of diameter corresponding to sphere (%) | Diameter of projected area (diameter corresponding to circle*2; μm) | Ratio of diameter to thickness | Surface iodo content (mol %) | Shape of particle |
|---|---|---|---|---|---|---|---|---|
| Emulsion A | 3.9 | 20 | 0.37 | 19 | 0.40 | 2.7 | 2.3 | Tabular grain |
| Emulsion B | 5.1 | 17 | 0.52 | 21 | 0.87 | 5.2 | 3.5 | Tabular grain |
| Emulsion C | 7.0 | 18 | 0.86 | 22 | 1.27 | 5.9 | 5.2 | Tabular grain |
| Emulsion D | 4.2 | 17 | 1.00 | 18 | 1.53 | 6.5 | 2.8 | Tabular grain |
| Emulsion E | 7.2 | 22 | 0.87 | 22 | 1.27 | 5.7 | 5.3 | Tabular grain |
| Emulsion F | 2.6 | 18 | 0.28 | 19 | 0.28 | 1.3 | 1.7 | Tabular grain |
| Emulsion G | 4.0 | 17 | 0.43 | 19 | 0.58 | 3.3 | 2.3 | Tabular grain |
| Emulsion H | 5.3 | 18 | 0.52 | 17 | 0.79 | 6.5 | 4.7 | Tabular grain |
| Emulsion I | 5.5 | 16 | 0.73 | 15 | 1.03 | 5.5 | 3.1 | Tabular grain |
| Emulsion J | 7.2 | 19 | 0.93 | 18 | 1.45 | 5.5 | 5.4 | Tabular grain |
| Emulsion K | 1.7 | 18 | 0.40 | 16 | 0.52 | 6.0 | 2.1 | Tabular grain |
| Emulsion L | 8.7 | 22 | 0.64 | 18 | 0.86 | 6.3 | 5.8 | Tabular grain |
| Emulsion M | 7.0 | 20 | 0.51 | 19 | 0.82 | 5.0 | 4.9 | Tabular grain |
| Emulsion N | 6.5 | 22 | 1.07 | 24 | 1.52 | 7.3 | 3.2 | Tabular grain |
| Emulsion Q | 1.0 | — | 0.07 | — | 0.07 | 1.0 | — | Uniform structure |
| Emulsion P | 0.9 | — | 0.07 | — | 0.07 | 1.0 | — | Uniform structure |

Note:
*1 The "diameter corresponding to sphere" means an average of diameters of spheres having volumes equal to the respective particle volumes.
*2 The "diameter corresponding to circle" means an average of diameters of circles having areas equal to the respective projected areas of the particles.

-continued

| UV-4 | 0.025 |
|---|---|
| HBS-1 | 0.12 |
| HBS-4 | $5.0 \times 10^{-2}$ |
| Gelatin | 2.3 |

Sixteenth Layer (Second protective layer)

| H-1 | 0.40 |
|---|---|
| B-1 (diameter: 1.7 μm) | $5.0 \times 10^{-2}$ |
| B-2 (diameter: 1.7 μm) | 0.15 |
| B-3 | 0.05 |
| S-1 | 0.20 |
| Gelatin | 0.75 |

Further, in order to improve preservability, processability, pressure resistance, antimold and antibacterial properties, antistatic property, and coating property, compounds of W-1 to W-5, B-4 to B-6, and F-1 to F-8, and salts of iron, lead, gold, platinum, palladium, iridium, ruthenium, and rhodium, were suitably added in each layer. Further, $8.5\times10^{-3}$ gram and $7.9\times10^{-3}$ gram of calcium were added to the eighth layer and eleventh layer, respectively, in the form of calcium nitrate aqueous solution to prepare the sample.

The AgI content, the grain size, the surface iodo content (percentage), and the like, of the above emulsions as indicated by an abbreviation, are shown in Table 4. The surface iodo content can be measured by the XPS as described In Table 4,
(1) Emulsions L to O were subjected to reduction sensitization using thiourea dioxide and thiosulfonic acid at the time of preparation of grains, according to the Example described in JP-A-2-191938.
(2) Emulsions A to O were subjected to gold sensitization, sulfur sensitization and selenium sensitization, under the presence of respective sensitizing dyes described in each layer and sodium thiocyanate, according to Example described in JP-A-3-237450.
(3) At the preparation of tabular grains, low-molecular-weight gelatin was used, according to Example described in JP-A-1-158426.
(4) Tabular grains were observed dislocation lines by a high-pressure electron microscope, as described in JP-A-3-237450.

Preparation of a dispersion of an organic solid disperse dye
ExF-2 as described below was dispersed according to the following method. That is, water (21.7 ml), a 5% aqueous solution of sodium p-octylphenoxyethoxy-ethoxyethanesulfonate (3 ml), and a 5% aqueous solution of p-octylphenoxypolyoxyethylene ether (polymerization degree 10) (0.5 g) were added to a pot mill (700 ml), and Dye ExF-2 (5.0 g) and zirconium oxide beads (diameter 1 mm) (500 ml) were further added thereto, and then the mixture was dispersed for 2 hours. For the dispersion, a BO-type vibration ball mill, manufactured by Chuo Koki Co., Ltd., was employed. After the dispersion, the mixture was taken out and added to 8 g of a 12.5% aqueous gelatin solution, and then the beads were removed by filtration, to obtain a gelatin dispersion of the dye. The average grain diameter of the dye in the form of fine grains was 0.44 μm.

In the similar manner, solid dispersions of ExF-3, ExF-4, and ExF-6 were obtained. The average grain diameter of these dyes in the form of fine grains was 0.24 μ, 0.45 μm, and 0.52 μm, respectively. On the other hand, ExF-5 was dispersed according to the dispersion method comprising microprecipitation, as described in Example 1 of EP-A-549,489. The average grain diameter of the dye was 0.06 μm.

Solid dispersion of ExF-8 was dispersed by the following method.

That is, to 1400 g of a wet cake of ExF-8 containing 30% of water, were added water and 70 g of W-2, the resulting mixture was stirred, and 70 g of ExF-8 was added there to followed by stirring, to make a slurry having a ExF-8 content of 30%. After that, an ULTRAVISCOMILL (UVM-2), trade name, manufactured by IMEX Co., Ltd., was filled with 1700 ml of zirconia beads (average grain diameter, 0.5 mm), and the thus-obtained slurry was passed and ground at the round speed of about 10 m/sec and a discharge rate of 0.5 liters/min for 8 hrs.

Compounds used in each layers described above were shown in the following.

ExC-1

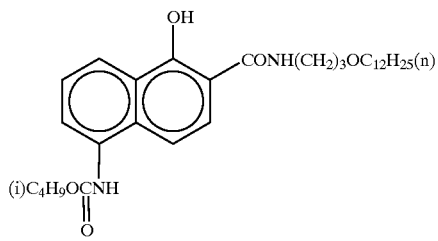

ExC-2

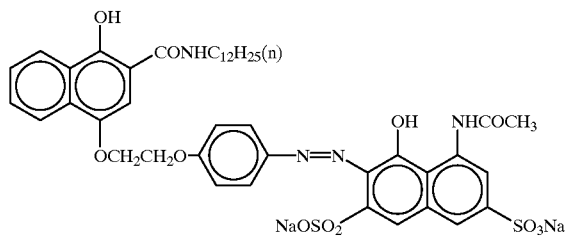

ExC-3

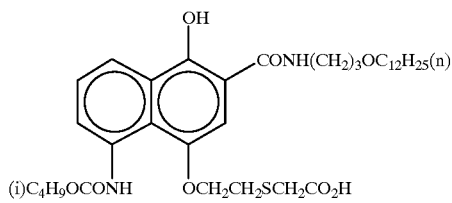

ExC-4

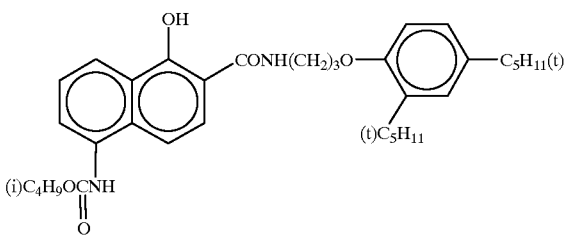

ExC-5

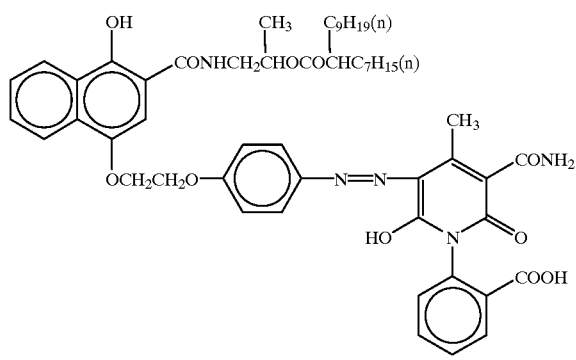

ExC-6

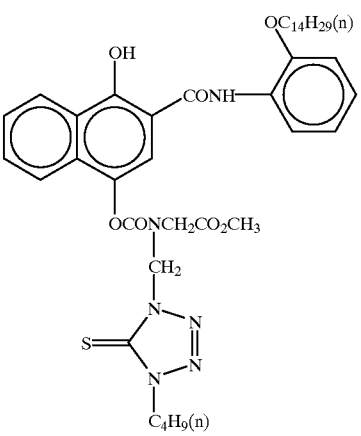

-continued
ExC-7
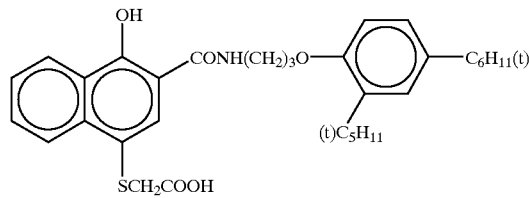
ExC-8
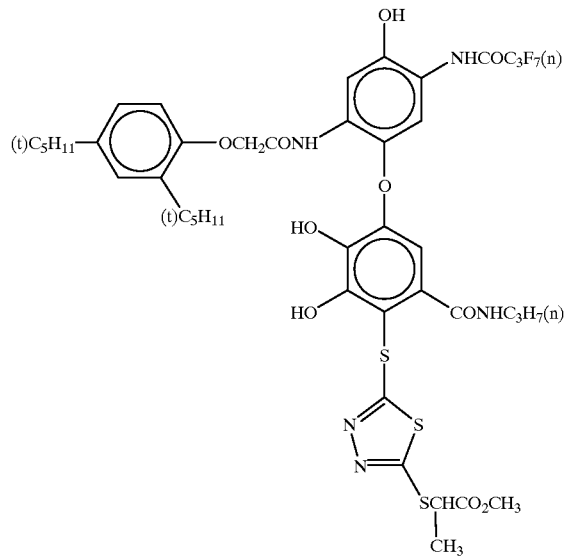
ExM-1
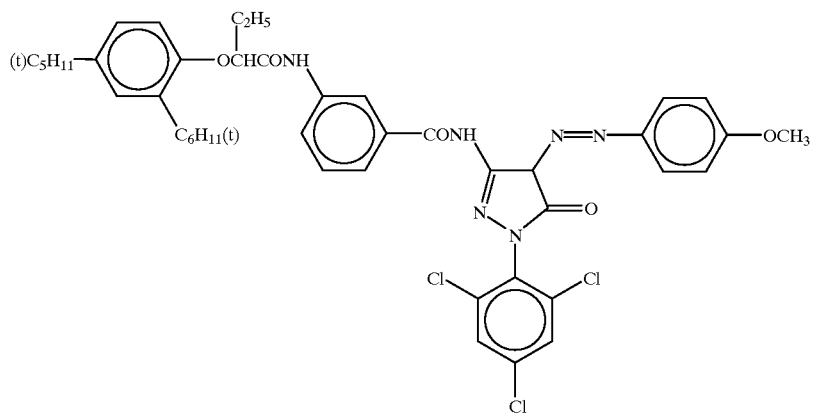
ExM-2
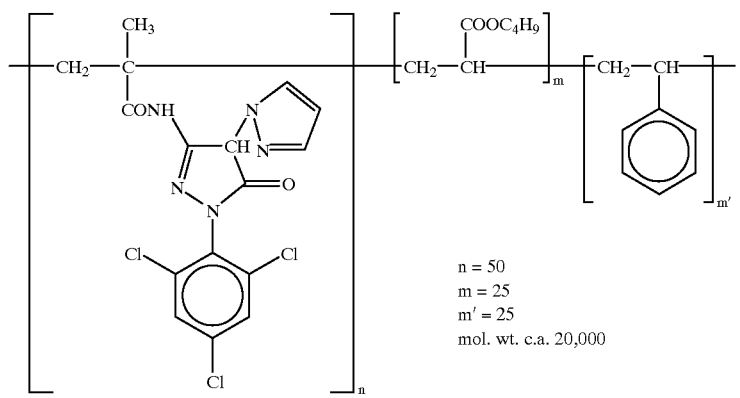
n = 50
m = 25
m' = 25
mol. wt. c.a. 20,000

-continued
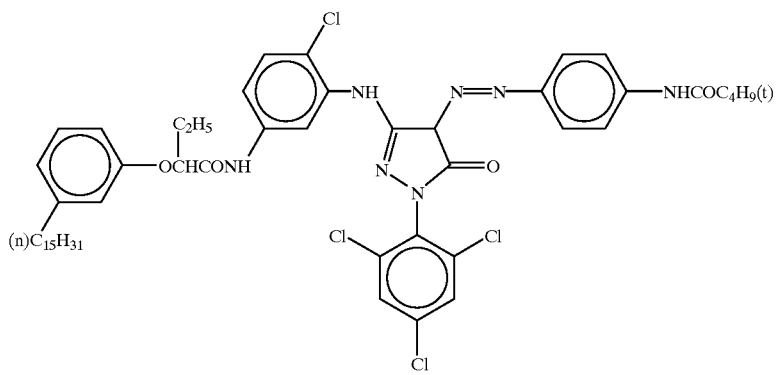
ExM-3
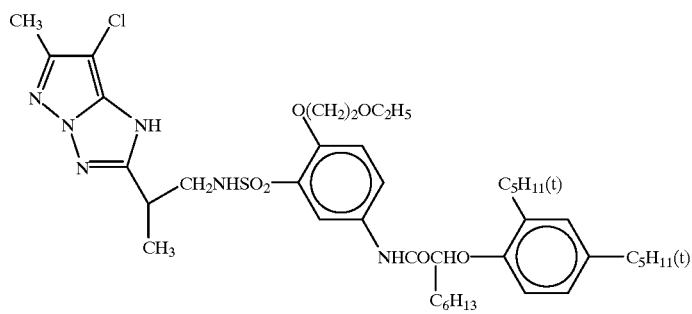
ExM-4
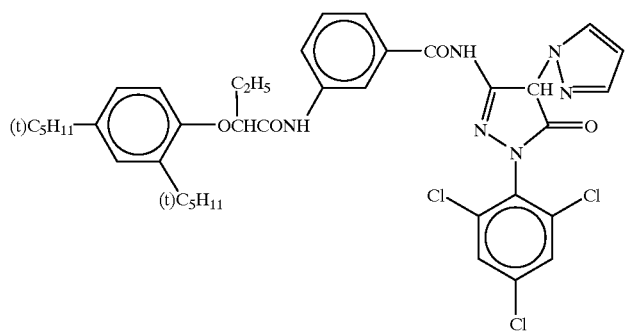
ExM-5
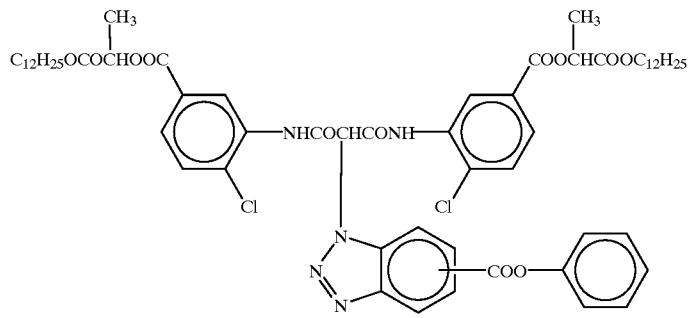
ExY-1

-continued
ExY-2
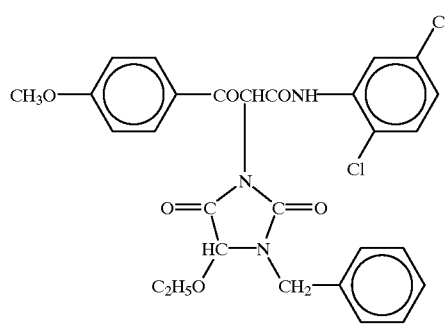
ExY-3
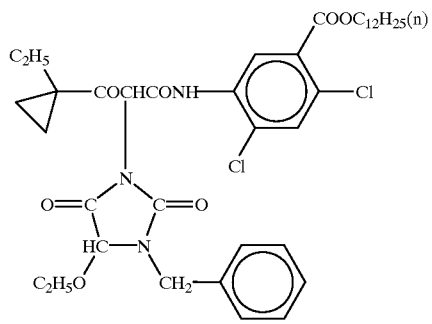
ExY-4
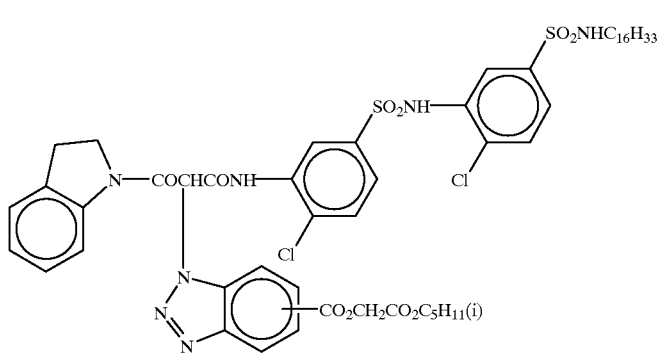
ExY-5
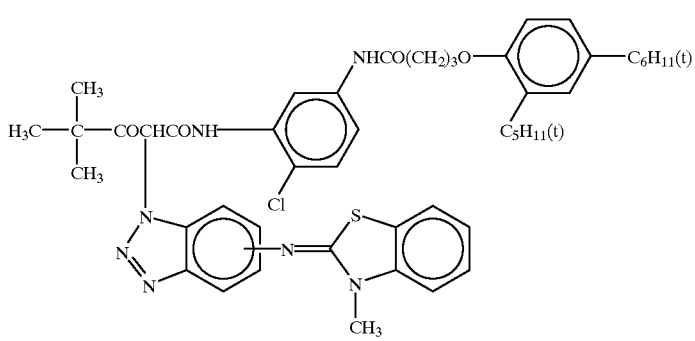
ExY-6
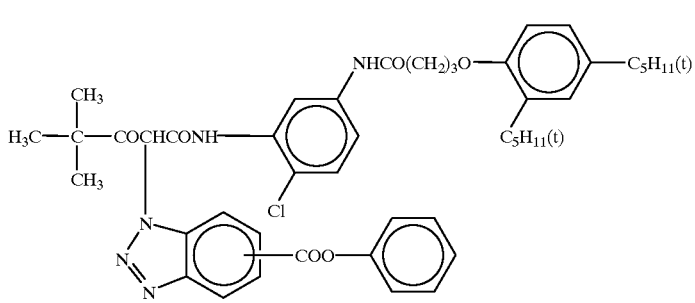
ExF-1
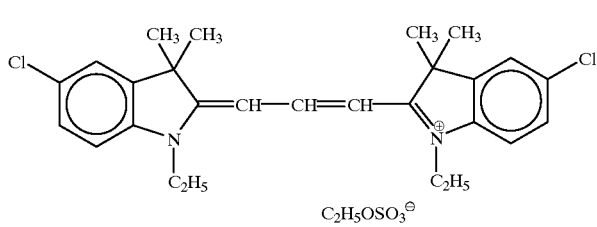

-continued
ExF-2
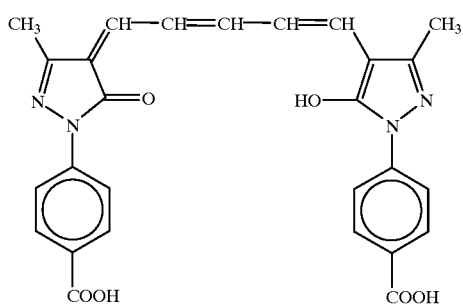
ExF-3
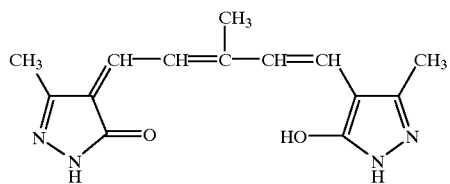
ExF-4
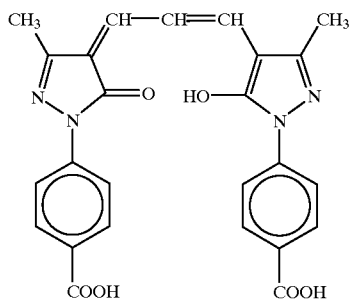
ExF-5
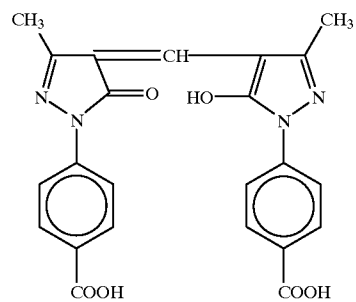
ExF-6
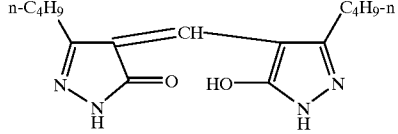
ExF-7
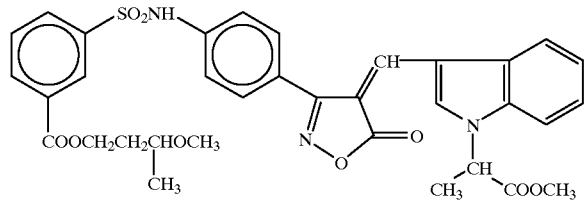
ExF-8
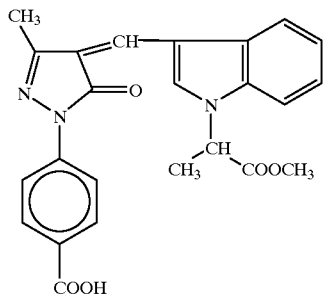
Cpd-1
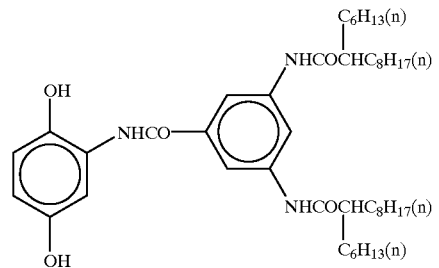
Cpd-2
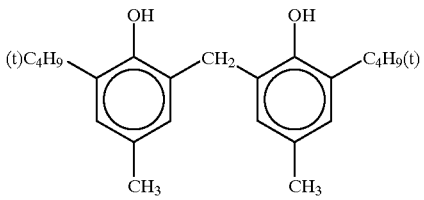
Cpd-3
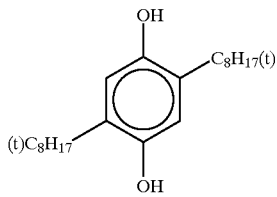

-continued
Cpd-4
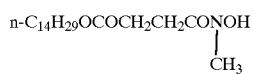
UV-1
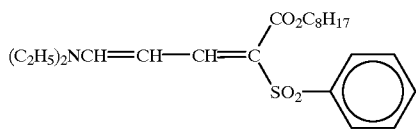
UV-2
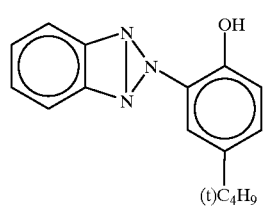
UV-3
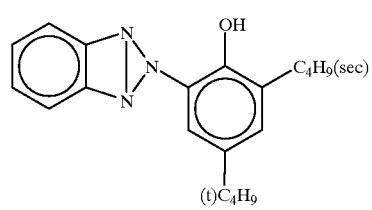
UV-4
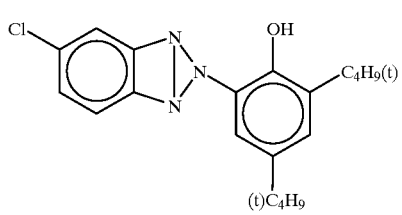
HBS-1
Tricresyl phosphate
HBS-2
Di-n-butyl phthalate
HBS-3
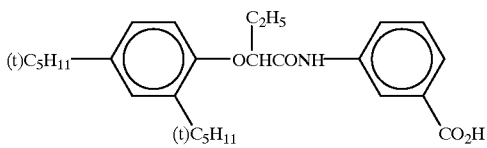
HBS-4
Tri(2-ethylhexyl) phosphate
ExS-1
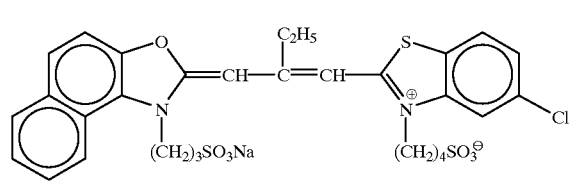
ExS-2
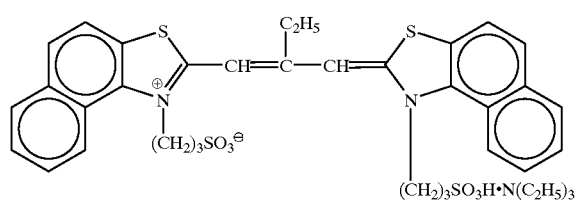
ExS-3
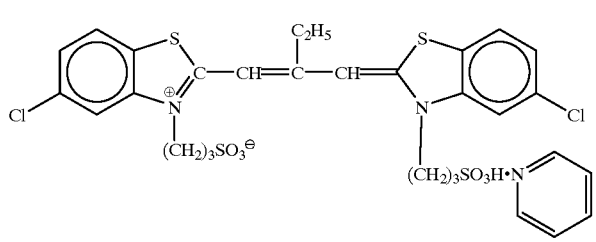
ExS-4
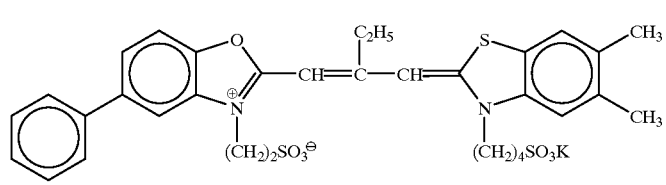

ExS-5
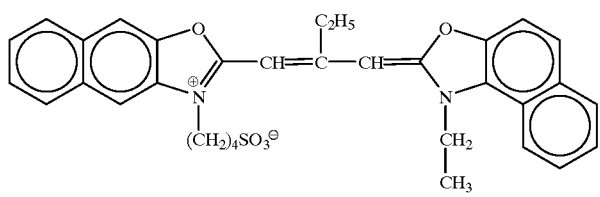
ExS-6
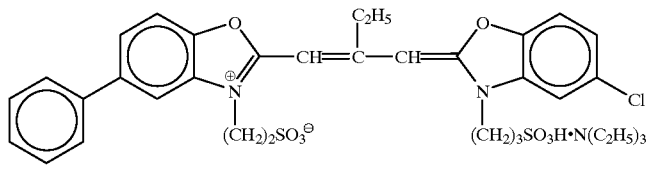
ExS-7
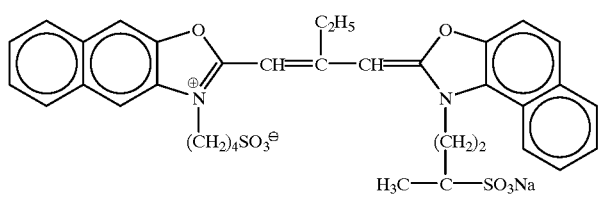
ExS-8
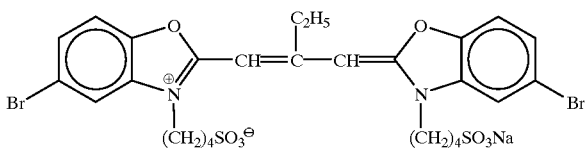
ExS-9            S-1
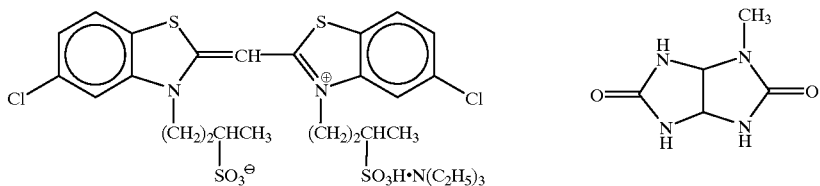
ExS-10
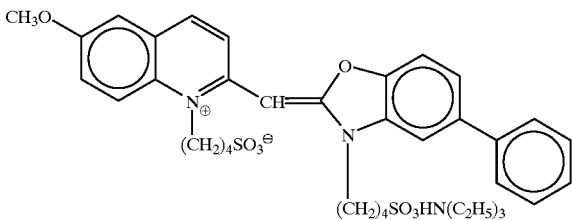
ExS-11            H-1
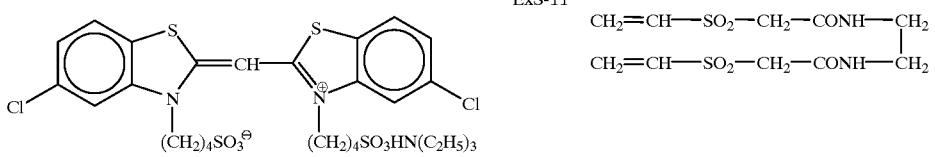
B-1            B-2
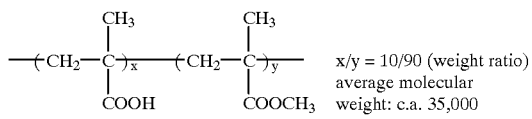 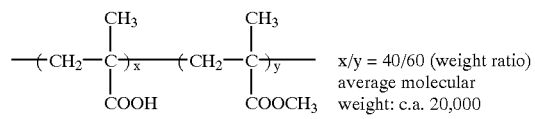

-continued
B-3 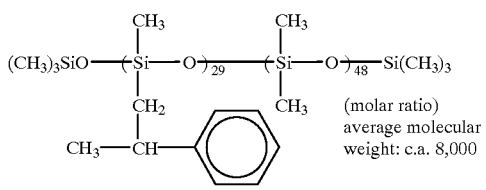
B-4 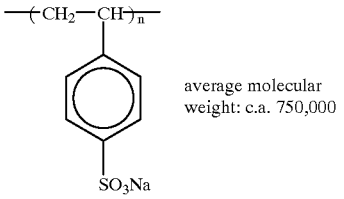
B-5 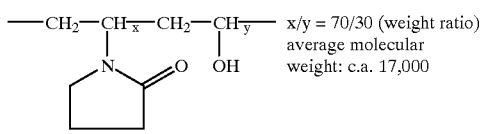
B-6 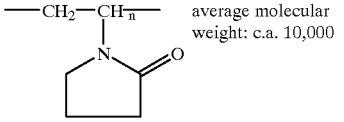
W-1 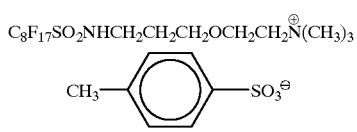
W-2 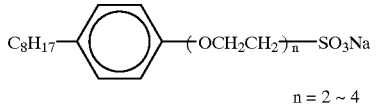
W-3 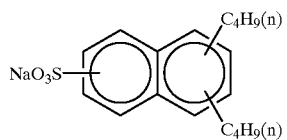
W-4 
W-5 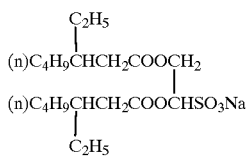
F-1 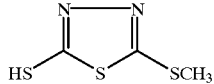
F-2 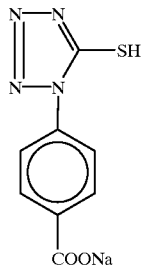
F-3 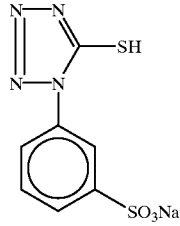
F-4 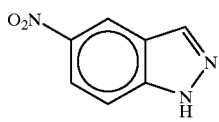
F-5 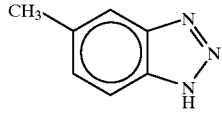
F-6 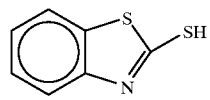
F-7 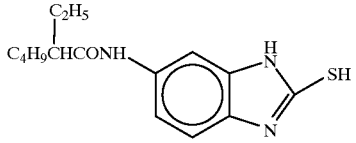

F-8

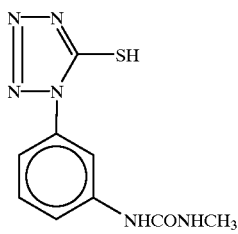

Color development processing was conducted using an automatic processor in the way described below, until the accumulative total of the replenishing rate of a solution reached 3 times the tank volume of its mother solution.

[Processing method]

| Step | Processing time | temperature | Replenishing rate | Tank volume |
|---|---|---|---|---|
| Color-Developing | 3 min 15 sec | 38° C. | 33 ml | 20 liter |
| Bleaching | 6 min 30 sec | 38° C. | 25 ml | 40 liter |
| Washing | 2 min 10 sec | 24° C. | 1200 ml | 20 liter |
| Fixing | 4 min 20 sec | 38° C. | 25 ml | 30 liter |
| Washing (1) | 1 min 05 sec | 24° C. | — | 10 liter |
| Washing (2) | 1 min 00 sec | 24° C. | 1200 ml | 10 liter |
| Stabilizing | 1 min 05 sec | 38° C. | 25 ml | 10 liter |
| Drying | 4 min 20 sec | 55° C. | | |

Note: Replenishing rate defines an amount per 1 m of the light-sensitive material having 35-mm width. Washing (1) was carried out in a counter-current mode from tank (2) to tank (1).

In the following, the constitution of the processing solutions were shown.

| | Mother Solution (g) | Replenisher (g) |
|---|---|---|
| (Color-developer) | | |
| Diethylenetriaminepentaacetic acid | 1.0 | 1.1 |
| 1-Hydroxyethylidene-1,1-diphosphonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-[N-ethyl-β-hydroxyethyl-amino]-2-methylaniline sulfate | 4.5 | 5.5 |
| Water to make | 1.0 liter | 1.0 liter |
| pH | 10.05 | 10.10 |
| (Bleaching solution) | | |
| Ethylenediaminetetraacetic acid iron(III) sodium trihydroxide | 100.0 | 120.0 |
| Disodium ethylenediaminetetraacetate | 10.0 | 10.0 |
| Ammonium bromide | 140.0 | 160.0 |
| Ammonium nitrate | 30.0 | 35.0 |
| Aqueous ammonia (27%) | 6.5 ml | 4.0 ml |
| Water to make | 1.0 liter | 1.0 liter |
| pH | 6.0 | 5.7 |
| (Fixing solution) | | |
| Disodium ethylenediaminetetraacetate | 0.5 | 0.7 |

| | Mother Solution (g) | Replenisher (g) |
|---|---|---|
| Sodium sulfite | 7.0 | 8.0 |
| Sodium bisulfite | 5.0 | 5.5 |
| Ammonium thiosulfate aqueous solution (70%) | 170.0 ml | 200.0 ml |
| Water to make | 1.0 liter | 1.0 liter |
| pH | 6.7 | 6.6 |
| (Stabilizing solution) | | |
| Formalin (37%) | 2.0 ml | 3.0 ml |
| Polyoxyethylene-p-monononylphenylether (av. polymerization degree: 10) | 0.3 | 0.45 |
| Disodium ethylenediaminetetraacetate | 0.05 | 0.05 |
| Water to make | 1.0 liter | 1.0 liter |
| pH | 5.0–8.0 | 5.0–8.0 |

Others Samples of the Invention

With respect to each of the above-described samples of the present invention, such modifications were made that a coating amount of the magnetic substance in the second layer was reduced by 0.6 time, the emulsion layers were changed to the same reversal color emulsion layers as sample 101 in Example 1 of JP-A-2-854, and moreover, the processing was carried out by a processing method for the color reversal light-sensitive material as shown in Example 1 of JP-A-2-854. Measurement was carried out in the same manner as in the above-described samples, and as a result, exactly the same improvement effects (results) were obtained, so that a transparent magnetic recording medium having a silver halide emulsion layer that is excellent in compatibility of the magnetic input/output capability and transparency, was obtained.

Having described our invention as related to the present embodiments, it is our intention that the invention not be limited by any of the details of the description, unless otherwise specified, but rather be construed broadly within its spirit and scope as set out in the accompanying claims.

What we claim is:

1. A transparent magnetic recording medium comprising a support and at least one magnetic recording layer containing magnetic particles provided thereon, which comprises, as an upper layer coated on the magnetic recording layer, a layer that contains at least one sort of spherical inorganic particles which are noncrystalline silica particles, having a Mohs' hardness of 6 to 8, the surface of the particles being treated with at least one of primary, secondary, or tertiary amine-series silane coupling agents, and that contains a higher fatty acid ester sliding agent.

2. The transparent magnetic recording medium as claimed in claim 1, wherein the surface of the spherical inorganic particles is treated with at least one of anionic surface active agents in combination with at least one of the primary, secondary, or tertiary amine-series silane coupling agents.

3. The transparent magnetic recording medium as claimed in claim 1, wherein said higher fatty acid ester sliding agent is previously dispersed with a solvent containing cyclohexanone, to form a dispersion thereof, and said upper layer contains the above-said dispersion of the higher fatty acid ester sliding agent, and at least one of coating solvents selected from a group consisting of diacetone alcohol, 1-acetoxy-2-methoxyethane, ethylene glycoldiacetate, methyl acetoacetate, and ethyl acetoacetate.

4. The transparent magnetic recording medium as claimed in claim 1, wherein said transparent magnetic recording layer contains inorganic particles having a primary particle size of from 1 nm to 50 nm in an amount of from 10 mg/m$^2$ to 200 mg/m$^2$.

5. The transparent magnetic recording medium as claimed in claim 4, wherein the inorganic particles are colloidal silica.

6. The transparent magnetic recording medium as claimed in claim 1, which further comprises spherical organic high molecular particles.

7. The transparent magnetic recording medium as claimed in claim 6, wherein an average primary particle size of the spherical organic high molecular particles is larger than an average primary particle size of the spherical inorganic particles.

8. The transparent magnetic recording medium as claimed in claim 6, wherein said transparent magnetic recording layer further contains alumina abrasives having substantially high particle size than the any average height of the surface protrusion of said spherical inorganic particles and said spherical organic high molecular particles.

9. A silver halide photographic light-sensitive material comprising a transparent magnetic recording layer containing magnetic particles, which comprises at least one light-sensitive silver halide emulsion layer provided on one side of a support opposite to the transparent magnetic recording layer, wherein the light-sensitive material comprises, as an upper layer coated on the magnetic recording layer, a layer that contains at least one sort of spherical inorganic particles which are noncrystalline silica particles, having a Moh's hardness of 6 to 8, the surface of the particles being treated with at least one of primary, secondary, or tertiary amine-series silane coupling agents, and that contains a higher fatty acid ester sliding agent.

10. The silver halide photographic light-sensitive material as claimed in claim 9, wherein the surface of the spherical inorganic particles is treated with at least one of anionic surface active agents in combination with at least one of the primary, secondary, or tertiary amine-series silane coupling agents.

11. The silver halide photographic light-sensitive material as claimed in claim 9, wherein said higher fatty acid ester sliding agent is previously dispersed with a solvent containing cyclohexanone, to form a dispersion thereof, and said upper layer contains the above-said dispersion of the higher fatty acid ester sliding agent, and at least one of coating solvents selected from a group consisting of diacetone alcohol, 1-acetoxy-2-methoxyethane, ethylene glycoldiacetate, methyl acetoacetate, and ethyl acetoacetate.

12. The silver halide photographic light-sensitive material as claimed in claim 9, wherein said transparent magnetic recording layer contains inorganic particles having a primary particle size of from 1 nm to 50 nm in an amount of from 10 mg/m$^2$ to 200 mg/m$^2$.

13. The silver halide photographic light-sensitive material as claimed in claim 12, wherein the inorganic particles are colloidal silica.

14. The silver halide photographic light-sensitive material as claimed in claim 9, which further comprises spherical organic high molecular particles.

15. The silver halide photographic light-sensitive material as claimed in claim 14, wherein an average primary particle size of the spherical organic high molecular particles is larger than an average primary particle size of the spherical inorganic particles.

16. The silver halide photographic light-sensitive material as claimed in claim 14, wherein said transparent magnetic recording layer further contains alumina abrasives having substantially higher particle size than the any average height of the surface protrusion of said spherical inorganic particles and said spherical organic high molecular particles.

17. A transparent magnetic recording medium comprising a support and at least one magnetic recording layer containing magnetic particles provided thereon, which comprises, as an upper layer coated on the magnetic recording layer, a layer that contains at least one sort of spherical inorganic particles which are noncrystalline silica particles, having a Mohs' hardness of 6 to 8, the surface of the particles being treated with at least one of primary, secondary, or tertiary amine-series silane coupling agents, and that contains a higher fatty acid ester sliding agent that is previously dispersed with a solvent containing cyclohexanrone, to form a dispersion thereof, and said upper layer contains the above-said dispersion of the higher fatty acid ester sliding agent, and at least one of coating solvents selected from a group consisting of diacetone alcohol, 1-acetoxy-2-methoxyethane, ethylene glycoldiacetate, methyl acetoacetate, and ethyl acetoacetate.

18. A transparent magnetic recording medium comprising a support, a spherical organic high molecular particle, and at least one magnetic recording layer containing magnetic particles provided thereon, which comprises, as an upper layer coated on the magnetic recording layer, a layer that contains at least one spherical inorganic particles which are noncrystalline silica particles having a Mohs' hardness of 6 to 8, the surface of the particles being treated with at least one of primary, secondary, or tertiary amine-series silane coupling agents, and that contains a higher fatty acid ester sliding agent, wherein said transparent magnetic recording layer further contains alumina abrasives having substantially higher particle size than any average height of the surface protrusion of said spherical inorganic particles and said spherical organic high molecular particles.

19. A silver halide photographic light-sensitive material comprising a transparent magnetic recording layer containing magnetic particles, which comprises at least one light-sensitive silver halide emulsion layer provided on one side of a support opposite to the transparent magnetic recording layer, wherein the light-sensitive material comprises, as an upper layer coated on the magnetic recording layer, a layer that contains at least one sort of spherical inorganic particles which are noncrystalline silica particles, having a Mohs' hardness of 6 to 8, the surface of the particles being treated with at least one of primary, secondary, or tertiary amine-series silane coupling agents, and that contains a higher fatty acid ester sliding agent that is previously dispersed with a solvent containing cyclohexanone, to form a dispersion thereof, and said upper layer contains the above-said dispersion of the higher fatty acid ester sliding agent, and at least one of coating solvents selected from the group consisting of diacetone alcohol, 1-acetoxy-2-methoxyethane, ethylene glycoldlacetate, methyl acetoacetate, and ethyl acetoacetate.

20. A silver halide photographic light-sensitive material comprising a transparent magnetic recording layer containing magnetic particles, which comprises at least one light-sensitive silver halide emulsion layer provided on one side of a support opposite to the transparent magnetic recording layer, wherein the light-sensitive material comprises, as an upper layer coated on the magnetic recording layer, a layer that contains at least one sort of spherical inorganic particles which are noncrystalline silica particles, having a Mohs' hardness of 6 to 8, the surface of the particles being treated with at least one of primary, secondary, or tertiary amine-series silane coupling agents, and that contains a higher fatty acid ester sliding agent, and spherical organic high molecular particles, wherein said transparent magnetic recording layer further contains alumina abrasives having substantially higher particle size than any average height of the surface protrusion of said spherical inorganic particles and said spherical organic high molecular particles.

* * * * *

UNITED STATES PATENT AND TRADEMARK OFFICE
CERTIFICATE OF CORRECTION

PATENT NO.   : 6,258,519 B1
DATED        : July 10, 2001
INVENTOR(S)  : Matsunaga et al.

It is certified that error appears in the above-identified patent and that said Letters Patent is hereby corrected as shown below:

<u>Title page,</u>
Item [30], please insert:
-- Foreign Application Priority Document
    September 9, 1998 [JP] Japan....272523 --

Signed and Sealed this

Twenty-fifth Day of June, 2002

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO.      : 6,258,519 B1
DATED           : July 10, 2001
INVENTOR(S)     : Matsunaga et al.

It is certified that error appears in the above-identified patent and that said Letters Patent is hereby corrected as shown below:

<u>Title page,</u>
Item [30], please delete:
"[30]  Foreign Application Priority Data
       September 9, 1998     [JP] Japan ................ 272523"

Please insert:
-- [30]  Foreign Application Priority Data
       September 9, 1998     [JP] Japan ................ 10-272523 --

Signed and Sealed this

Eleventh Day of February, 2003

JAMES E. ROGAN
*Director of the United States Patent and Trademark Office*